US009241396B2

(12) United States Patent
Foret

(10) Patent No.: US 9,241,396 B2
(45) Date of Patent: Jan. 19, 2016

(54) METHOD FOR OPERATING A PLASMA ARC TORCH HAVING MULTIPLE OPERATING MODES

(71) Applicant: Foret Plasma Labs, LLC, The Woodlands, TX (US)

(72) Inventor: Todd Foret, The Woodlands, TX (US)

(73) Assignee: Foret Plasma Labs, LLC, The Woodlands, TX (US)

( * ) Notice: Subject to any disclaimer, the term of this patent is extended or adjusted under 35 U.S.C. 154(b) by 0 days.

(21) Appl. No.: 14/326,560

(22) Filed: Jul. 9, 2014

(65) Prior Publication Data

US 2014/0326704 A1    Nov. 6, 2014

Related U.S. Application Data

(63) Continuation of application No. 13/633,128, filed on Oct. 1, 2012, now Pat. No. 8,810,122, which is a continuation-in-part of application No. 12/371,575, filed on Feb. 13, 2009, now Pat. No. 8,278,810, which (Continued)

(51) Int. Cl.
*H05H 1/38* (2006.01)
*B23K 10/00* (2006.01)
*H05H 1/34* (2006.01)

(52) U.S. Cl.
CPC ............... *H05H 1/38* (2013.01); *B23K 10/00* (2013.01); *H05H 1/34* (2013.01); *H05H 2001/3431* (2013.01)

(58) Field of Classification Search
USPC .................................................. 313/231.41
See application file for complete search history.

(56) References Cited

U.S. PATENT DOCUMENTS

| 1,481,979 A | 9/1892 | Stanley |
| 2,501,732 A | 7/1893 | Roeske |

(Continued)

FOREIGN PATENT DOCUMENTS

| JP | 2006-501980 A | 1/2006 |
| KR | 101999009569 A | 2/1999 |

(Continued)

OTHER PUBLICATIONS

PCT/US2014/030090 [KIPO] International Search Report dated Sep. 25, 2014.

(Continued)

*Primary Examiner* — Nimeshkumar Patel
*Assistant Examiner* — Brenitra M Lee
(74) *Attorney, Agent, or Firm* — Daniel J. Chalker; Edwin S. Flores; Chalker Flores, LLP

(57) ABSTRACT

The present invention provides a multi-mode plasma arc torch that includes a cylindrical vessel having a first end and a second end, a first tangential inlet/outlet connected to or proximate to the first end, a second tangential inlet/outlet connected to or proximate to the second end, an electrode housing connected to the first end of the cylindrical vessel such that a first electrode is (a) aligned with a longitudinal axis of the cylindrical vessel, and (b) extends into the cylindrical vessel, and a hollow electrode nozzle connected to the second end of the cylindrical vessel such that the center line of the hollow electrode nozzle is aligned with the longitudinal axis of the cylindrical vessel. Adjusting a position of the electrode with respect to the hollow electrode causes the multi-mode plasma arc torch to operate in a dead short resistive mode, a submerged arc mode, an electrolysis mode, a glow discharge mode or a plasma arc mode.

58 Claims, 16 Drawing Sheets

Related U.S. Application Data is a continuation-in-part of application No. 12/288,170, filed on Oct. 16, 2008, now Pat. No. 9,051,820, said application No. 12/371,575 is a continuation-in-part of application No. 12/370,591, filed on Feb. 12, 2009, now Pat. No. 8,074,439.

(60) Provisional application No. 60/980,443, filed on Oct. 16, 2007, provisional application No. 61/027,879, filed on Feb. 12, 2008, provisional application No. 61/028,386, filed on Feb. 13, 2008.

(56) References Cited

U.S. PATENT DOCUMENTS

| | | |
|---|---|---|
| 2,784,294 A | 3/1957 | Gravert |
| 2,898,441 A | 8/1959 | Reed et al. |
| 2,923,809 A | 2/1960 | Clews et al. |
| 3,004,189 A | 10/1961 | Giannini |
| 3,082,314 A | 3/1963 | Arata et al. |
| 3,131,288 A | 4/1964 | Browning et al. |
| 3,242,305 A | 3/1966 | Kane et al. |
| 3,534,388 A | 10/1970 | Ito et al. |
| 3,567,898 A | 3/1971 | Fein |
| 3,619,549 A | 11/1971 | Hogan et al. |
| 3,641,308 A | 2/1972 | Couch, Jr. et al. |
| 3,787,247 A | 1/1974 | Couch, Jr. |
| 3,798,784 A | 3/1974 | Kovats et al. |
| 3,830,428 A | 8/1974 | Dyos |
| 3,833,787 A | 9/1974 | Couch, Jr. |
| 4,067,390 A | 1/1978 | Camacho et al. |
| 4,169,503 A | 10/1979 | Scott |
| 4,203,022 A | 5/1980 | Couch, Jr. et al. |
| 4,265,747 A | 5/1981 | Copa et al. |
| 4,311,897 A | 1/1982 | Yerushalmy |
| 4,344,839 A | 8/1982 | Pachkowski et al. |
| 4,463,245 A | 7/1984 | McNeil |
| 4,531,043 A | 7/1985 | Zverina et al. |
| 4,567,346 A | 1/1986 | Marhic |
| 4,624,765 A | 11/1986 | Cerkanowicz et al. |
| 4,685,963 A | 8/1987 | Saville et al. |
| 4,776,638 A | 10/1988 | Hahn |
| 4,791,268 A | 12/1988 | Sanders et al. |
| 4,886,118 A | 12/1989 | Van Meurs et al. |
| 5,019,268 A | 5/1991 | Rogalla |
| 5,048,404 A | 9/1991 | Bushnell et al. |
| 5,082,054 A | 1/1992 | Kiamanesh |
| 5,132,512 A | 7/1992 | Sanders et al. |
| 5,166,950 A | 11/1992 | Jouvaud et al. |
| 5,326,530 A | 7/1994 | Bridges |
| 5,348,629 A | 9/1994 | Khudenko |
| 5,368,724 A | 11/1994 | Ayres et al. |
| 5,534,232 A | 7/1996 | Denes et al. |
| 5,609,736 A * | 3/1997 | Yamamoto ............... 204/164 |
| 5,609,777 A | 3/1997 | Apunevich et al. |
| 5,655,210 A | 8/1997 | Gregoire et al. |
| 5,660,743 A | 8/1997 | Nemchinsky |
| 5,738,170 A | 4/1998 | Lavernhe |
| 5,746,984 A | 5/1998 | Hoard |
| 5,760,363 A | 6/1998 | Hackett et al. |
| 5,766,447 A | 6/1998 | Creijghton |
| 5,876,663 A | 3/1999 | Laroussi |
| 5,879,555 A | 3/1999 | Khudenko |
| 5,893,979 A | 4/1999 | Held |
| 5,908,539 A | 6/1999 | Young et al. |
| 5,979,551 A | 11/1999 | Uban et al. |
| 6,007,681 A | 12/1999 | Kawamura et al. |
| 6,117,401 A | 9/2000 | Juvan |
| 6,228,266 B1 | 5/2001 | Shim |
| 6,514,469 B1 | 2/2003 | Kado et al. |
| 6,749,759 B2 | 6/2004 | Denes et al. |
| 6,929,067 B2 | 8/2005 | Vinegar et al. |
| 6,942,786 B1 | 9/2005 | Fosseng |
| 6,987,792 B2 | 1/2006 | Do et al. |
| 7,081,171 B1 | 7/2006 | Sabol et al. |
| 7,086,468 B2 | 8/2006 | De Rouffignac et al. |
| 7,096,953 B2 | 8/2006 | De Rouffignac et al. |
| 7,121,342 B2 | 10/2006 | Vinegar et al. |
| 7,128,816 B2 | 10/2006 | Denes et al. |
| 7,422,695 B2 | 9/2008 | Foret |
| 7,536,975 B2 | 5/2009 | Denes et al. |
| 7,857,972 B2 | 12/2010 | Foret |
| 7,893,408 B2 | 2/2011 | Hieftje et al. |
| 8,074,439 B2 | 12/2011 | Foret |
| 8,278,810 B2 | 10/2012 | Foret |
| 8,568,663 B2 | 10/2013 | Foret |
| 8,810,122 B2 | 8/2014 | Foret |
| 8,833,054 B2 | 9/2014 | Foret |
| 8,904,749 B2 | 12/2014 | Foret |
| 9,051,820 B2 | 6/2015 | Foret |
| 2002/0148562 A1 | 10/2002 | Aoyagi et al. |
| 2003/0024806 A1 | 2/2003 | Foret |
| 2003/0101936 A1 | 6/2003 | Lee |
| 2003/0150325 A1 | 8/2003 | Hyppanen |
| 2003/0179536 A1 | 9/2003 | Stevenson et al. |
| 2003/0213604 A1 | 11/2003 | Stevenson et al. |
| 2005/0087435 A1 | 4/2005 | Kong et al. |
| 2005/0151455 A1 | 7/2005 | Sato et al. |
| 2005/0155373 A1* | 7/2005 | Hirooka et al. ............... 62/498 |
| 2006/0104849 A1 | 5/2006 | Tada et al. |
| 2006/0151445 A1 | 7/2006 | Schneider |
| 2006/0196424 A1 | 9/2006 | Swallow et al. |
| 2007/0104610 A1 | 5/2007 | Houston et al. |
| 2007/0240975 A1 | 10/2007 | Foret |
| 2007/0253874 A1 | 11/2007 | Foret |
| 2008/0058228 A1 | 3/2008 | Wilson |
| 2008/0202915 A1 | 8/2008 | Hieftje et al. |
| 2009/0118145 A1 | 5/2009 | Wilson et al. |
| 2009/0200032 A1 | 8/2009 | Foret |
| 2009/0235637 A1 | 9/2009 | Foret |
| 2009/0277774 A1 | 11/2009 | Foret |
| 2010/0212498 A1 | 8/2010 | Salazar |
| 2011/0005999 A1 | 1/2011 | Randal |
| 2011/0022043 A1 | 1/2011 | Wandke et al. |
| 2011/0031224 A1 | 2/2011 | Severance, Jr. et al. |
| 2011/0225948 A1 | 9/2011 | Valeev et al. |
| 2012/0097648 A1 | 4/2012 | Foret |
| 2012/0227968 A1 | 9/2012 | Eldred et al. |
| 2013/0020926 A1 | 1/2013 | Foret |

FOREIGN PATENT DOCUMENTS

| | | |
|---|---|---|
| KR | 10-2004-0005107 A | 1/2004 |
| WO | 2007117634 A2 | 10/2007 |

OTHER PUBLICATIONS

PCT/US2014/2014/024991 [KIPO] International Search Report dated Aug. 6, 2014.

Belani, A., "It's Time for an Industry Initiative on Heavy Oil," JPT Online accessed on Oct. 16, 2007 at http://www.spe.org/spe-app/spe/jpt/2006/06/mangement_heavy_oil.htm.

"Brandt, A. R., "Converting Green River oil shale to liquid fuels with Alberta Taciuk Processor: energy inputs andgreenhouse gas emissions," Jun. 1, 2007".

Brandt, A. R., "Converting Green River oil shale to liquid fuels with the Shell in-situ conversion process: energy inputs and greenhouse gas emissions," Jun. 30, 2007.

Kavan, L., "Electrochemical Carbon," Chem Rev (1997), 97:3061-3082.

Understanding in-situ combustion, www.HeavyOilinfo.com, accessed Oct. 16, 2007.

Unleashing the potential: Heavy Oil, Supplement to E&P Annual Reference Guide, www.eandp.info.com, Jun. 2007.

International Search Report [KIPO] PCT/US201/062941 dated Jan. 27, 2014.

International Search Report and Written Opinion for PCT/US2008/011926 dated Apr. 27, 2009.

International Search Report and Written Opinion for PCT/US2009/000937 dated Sep. 17, 2009.

* cited by examiner

Fig. 10 - Tailings Pond Water Results

FILTRATE:

| | Sample | Date | pH | SG | Cr | %N | ppm F | %Fe2O3 | %SO4 | ppm NH3 | %P2O5 | %Si | %MgO | %Al2O3 | %CaO | %Na | %K | As | Cr | Co | Cu | Mo | Ni |
|---|---|---|---|---|---|---|---|---|---|---|---|---|---|---|---|---|---|---|---|---|---|---|---|
| A | Tailings Pond Water | 30-Oct | 1.4 | 1.0468 | 4.0 | 0.14 | 7,921 | 0.01 | 0.40 | 1,310 | 2.17 | 0.06 | 0.04 | 0.01 | 0.25 | 0.26 | 0.03 | 7.8 | 0.7 | 0.0 | 2.5 | 1.0 | 3.0 |
| 1 | Hi Temper | 6-Nov | 2.3 | 1.0300 | 0.0 | 0.01 | 103 | 0.00 | 0.01 | 497 | 0.00 | 0.01 | 0.00 | 0.00 | 0.05 | 0.05 | 0.01 | 2.3 | 0.0 | 0.0 | 1.5 | 0.0 | 0.0 |
| 2 | Hi Temper Arc White Arc Whirl, plasma on | 6-Nov | 1.7 | 1.0300 | 18.3 | 0.01 | 3,480 | 0.02 | 0.24 | 708 | 0.69 | 0.03 | 0.02 | 0.01 | 0.17 | 0.14 | 0.02 | 5.5 | 0.0 | 0.0 | 7.8 | 0.2 | 14.0 |
| 3 | Hi Temper Air Arc White | 6-Nov | 1.5 | 1.0400 | 71.4 | 0.18 | 8,570 | 0.06 | 0.52 | 1,630 | 2.30 | 0.04 | 0.05 | 0.01 | 0.35 | 0.26 | 0.03 | 7.3 | 0.3 | 0.0 | 15.7 | 0.6 | 42.2 |
| 4 | Bottoms Off reactor | 6-Nov | 1.2 | 1.1500 | 667.3 | 0.15 | 14,400 | 8.76 | 1.39 | 4,340 | 8.72 | 0.03 | 0.16 | 0.02 | 0.88 | 0.24 | 0.04 | 12.4 | 4.1 | 4.0 | 15.3 | 7.0 | 356.7 |
| 5 | Bomb Gas, Arc on, plasma off | 6-Nov | | | | | | | | | | | | | | | | | | | | | |

Cycles of concentration (COC Set 1)

| | | | | | | | 167 | | | 3 | 4 | 1 | 4 | 2 | 3 | 1 | 1 | 2 | 6 | 400 | 4 | 7 | 120 |
|---|---|---|---|---|---|---|---|---|---|---|---|---|---|---|---|---|---|---|---|---|---|---|---|
| | | | | | | | 55 | | | 2 | 1 | 0 | 3 | 0 | 2 | 1 | 1 | 1 | 3 | 30 | 2 | 3 | 84 |

Insufficient sample recovered for analysis.

SOLIDS (Retained on Whatmans 540 filter paper):

| | Sample | Date | gm, dry | %P2O5 | %SO4 | %MgO | %Al2O3 | %Fe2O3 | %CaO | %Na | %K | %Si | ppmH |
|---|---|---|---|---|---|---|---|---|---|---|---|---|---|
| A | Tailings | 30-Oct | | 1.30 | 3.35 | 0.06 | 0.45 | 0.09 | 3.58 | 0.44 | 0.05 | 0.08 | 14 |
| 1 | Hi Temper | 6-Nov | 2.7 | 0.0 | 0.2 | 0.02 | 0.02 | 1.09 | 0.2 | 0.22 | 0.02 | 0.02 | 0.0 |
| 2 | Hi Temper Arc Whirl Arc Whirl, plasma on | 6-Nov | 2.7 | 1.6 | 0.5 | 0.04 | 0.02 | 0.30 | 0.4 | 0.31 | 0.03 | 0.03 | 0.0 |
| 3 | Hi Temper Air Arc White | 6-Nov | 4.0 | 2.5 | 0.7 | 0.04 | 0.10 | 0.83 | 1.0 | 0.22 | 0.04 | 0.04 | 0.0 |
| 4 | Bottoms Off reactor | 6-Nov | 28.1 | 1.8 | 13.6 | 0.03 | 0.25 | 0.35 | 5.7 | 13.67 | 2.76 | 0.85 | 0.0 |
| 5 | Bomb Gas, Arc on, plasma off | 6-Nov | | | | | insufficient sample recovered for analysis. | | | | | | |

FIG 10 (Continued)

| Pb | Se | Mn | U | V | Zn | Ti | Appearance: |
|---|---|---|---|---|---|---|---|
| 0.0 | 3.0 | 12.0 | 14.0 | 7.4 | 20.2 | 1.7 | Colorless, slightly cloudy Settlable fines |
| 0.0 | 3.4 | 0.0 | 0.0 | 0.0 | 1.6 | 0.0 | Clear, yellowish or brownish |
| 0.0 | 2.7 | 4.2 | 2.2 | 1.3 | 13.4 | 0.0 | Clear, yellowish or brownish |
| 0.0 | 2.0 | 18.6 | 12.0 | 5.4 | 49.6 | 13.7 | Very light green |
| 0.0 | 1.3 | 112.7 | 41.1 | 26.4 | 354.4 | 7.7 | Dark green, with sediment |

| | | | | | | |
|---|---|---|---|---|---|---|
| 0 | 0 | 9 | 3 | 4 | 18 | 5 |
| 0 | 0 | 7 | 1 | 2 | 24 | 0 |

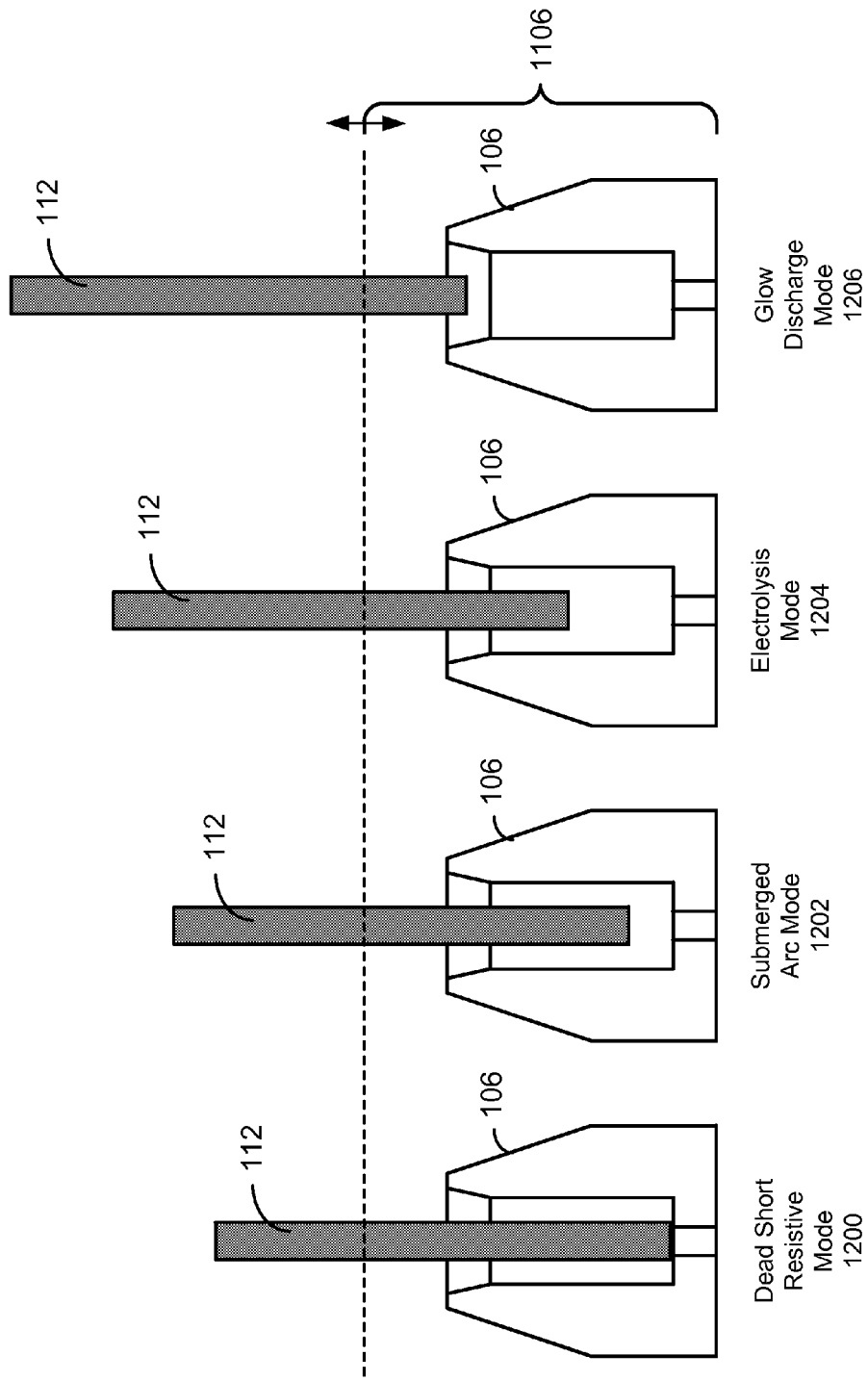

METHOD FOR OPERATING A PLASMA ARC TORCH HAVING MULTIPLE OPERATING MODES

PRIORITY CLAIM AND CROSS-REFERENCE TO RELATED APPLICATIONS

This patent application is a continuation application of U.S. patent application Ser. No. 13/633,128 filed on Oct. 1, 2012, now U.S. Pat. No. 8,810,122, and entitled "Plasma Arc Torch Having Multiple Operating Modes", which is a continuation-in-part application of U.S. patent application Ser. No. 12/371,575 filed on Feb. 13, 2009, now U.S. Pat. No. 8,278,810, and entitled "Solid Oxide High Temperature Electrolysis Glow Discharge", which is (a) a continuation-in-part application of U.S. patent application Ser. No. 12/288,170 filed on Oct. 16, 2008 and entitled "System, Method And Apparatus for Creating an Electric Glow Discharge", which is a non-provisional application of U.S. provisional patent application 60/980,443 filed on Oct. 16, 2007 and entitled "System, Method and Apparatus for Carbonizing Oil Shale with Electrolysis Plasma Well Screen"; (b) a continuation-in-part application of U.S. patent application Ser. No. 12/370,591 filed on Feb. 12, 2009, now U.S. Pat. No. 8,074,439, and entitled "System, Method and Apparatus for Lean Combustion with Plasma from an Electrical Arc", which is non-provisional patent application of U.S. provisional patent application Ser. No. 61/027,879 filed on Feb. 12, 2008 and entitled, "System, Method and Apparatus for Lean Combustion with Plasma from an Electrical Arc"; and (c) a non-provisional patent application of U.S. provisional patent application 61/028,386 filed on Feb. 13, 2008 and entitled "High Temperature Plasma Electrolysis Reactor Configured as an Evaporator, Filter, Heater or Torch." All of the foregoing applications are hereby incorporated by reference in their entirety.

This application is also related to U.S. Pat. No. 7,422,695 and U.S. Pat. No. 7,857,972 and multiple patents and patent application that claim priority thereto.

FIELD OF THE INVENTION

The present invention relates generally to solid oxide electrolysis cells and plasma torches. More specifically, the present invention relates to a method for operating plasma torch having multiple operating modes.

BACKGROUND OF THE INVENTION

Glow discharge and plasma systems are becoming every more present with the emphasis on renewable fuels, pollution prevention, clean water and more efficient processing methods. Glow discharge is also referred to as electro-plasma, plasma electrolysis and high temperature electrolysis. In liquid glow discharge systems a plasma sheath is formed around the cathode located within an electrolysis cell.

U.S. Pat. No. 6,228,266 discloses a water treatment apparatus using a plasma reactor and a method of water treatment. The apparatus includes a housing having a polluted water inlet and a polluted water outlet; a plurality of beads (e.g., nylon and other plastic type beads) filled into the interior of the housing; a pair of electrodes, one of the electrodes contacting with the bottom of the housing, another of the electrodes contacting an upper portion of the uppermost beads; and a pulse generator connected with the electrodes by a power cable for generating pulses. Some drawbacks of the '266 plasma reactor are the requirements of an extremely high voltage pulse generator (30 KW to 150 KW), a plurality of various beads in a web shape and operating the reactor full from top to bottom. Likewise, the plasma reactor is not designed for separating a gas from the bulk liquid, nor can it recover heat or generate hydrogen. In fact, the addition of air to the plasma reactor completely defeats the sole purpose of current research for generating hydrogen via electrolysis or plasma or a combination of both. If any hydrogen is generated within the plasma reactor, the addition of air will cause the hydrogen to react with oxygen and form water. Also, there is no mention of any means for generating heat by cooling the cathode. Likewise, there is no mention of cooking organics unto the beads, nor the ability to reboil and concentrate liquids (e.g., spent acids, black liquor, etc.), nor recovering caustic and sulfides from black liquor.

The following is a list of prior art similar to the '266 patent:

| Pat. No. | Title |
| --- | --- |
| 481,979 | Apparatus for electrically purifying water |
| 501,732 | Method of an apparatus for purifying water |
| 3,798,784 | Process and apparatus for the treatment of moist materials |
| 4,265,747 | Disinfection and purification of fluids using focused laser radiation |
| 4,624,765 | Separation of dispersed liquid phase from continuous fluid phase |
| 5,019,268 | Method and apparatus for purifying waste water |
| 5,048,404 | High pulsed voltage systems for extending the shelf life of pumpable food products |
| 5,326,530 | High pulsed voltage systems for extending the shelf life of pumpable food products |
| 5,348,629 | Method and apparatus for electrolytic processing of materials |
| 5,368,724 | Apparatus for treating a confined liquid by means of a pulse electrical discharge |
| 5,655,210 | Corona source for producing corona discharge and fluid waste treatment with corona discharge |
| 5,746,984 | Exhaust system with emissions storage device and plasma reactor |
| 5,879,555 | Electrochemical treatment of materials |
| 6,007,681 | Apparatus and method for treating exhaust gas and pulse generator used therefor |

Plasma arc torches are commonly used by fabricators, machine shops, welders and semi-conductor plants for cutting, gouging, welding, plasma spraying coatings and manufacturing wafers. The plasma torch is operated in one of two modes—transferred arc or non-transferred arc. The most common torch found in many welding shops in the transferred arc plasma torch. It is operated very similar to a DC welder in that a grounding clamp is attached to a workpiece. The operator, usually a welder, depresses a trigger on the plasma torch handle which forms a pilot arc between a centrally located cathode and an anode nozzle. When the operator brings the plasma torch pilot arc close to the workpiece the arc is transferred from the anode nozzle via the electrically conductive plasma to the workpiece. Hence the name transferred arc. The non-transferred arc plasma torch retains the arc within the torch. Quite simply the arc remains attached to the anode nozzle. This requires cooling the anode. Common non-transferred arc plasma torches have a heat rejection rate of 30%. In other words, 30% of the total torch power is rejected as heat.

A major drawback in using plasma torches is the cost of inert gases such as argon and hydrogen. There have been several attempts for forming the working or plasma gas within the torch itself by using rejected heat from the electrodes to generate steam from water. The objective is to increase the total efficiency of the torch as well as reduce plasma gas cost. However, there is not a single working example that can run continuous duty. For example, the Multiplaz torch (U.S. Pat. Nos. 6,087,616 and 6,156,994) is a small hand held torch that must be manually refilled with water. The Multiplaz torch is not a continuous use plasma torch.

Other prior art plasma torches are disclosed in the following patents.

| Pat. No. | Title |
|---|---|
| 3,567,898 | Plasma cutting torch |
| 3,830,428 | Plasma torches |
| 4,311,897 | Plasma arc torch and nozzle assembly |
| 4,531,043 | Method of and apparatus for stabilization of low-temperature plasma of an arc burner |
| 5,609,777 | Electric-arc plasma steam torch |
| 5,660,743 | Plasma arc torch having water injection nozzle assembly |

U.S. Pat. No. 4,791,268 discloses "an arc plasma torch includes a moveable cathode and a fixed anode which are automatically separated by the buildup of gas pressure within the torch after a current flow is established between the cathode and the anode. The gas pressure draws a nontransferred pilot arc to produce a plasma jet. The torch is thus contact started, not through contact with an external workpiece, but through internal contact of the cathode and anode. Once the pilot arc is drawn, the torch may be used in the nontransferred mode, or the arc may be easily transferred to a workpiece. In a preferred embodiment, the cathode has a piston part which slidingly moves within a cylinder when sufficient gas pressure is supplied. In another embodiment, the torch is a hand-held unit and permits control of current and gas flow with a single control."

Typically, and as disclosed in the '268 patent, plasma torch gas flow is set upstream of the torch with a pressure regulator and flow regulator. In addition to transferred arc and non-transferred arc, plasma arc torches can be defined by arc starting method. The high voltage method starts by using a high voltage to jump the arc from the centered cathode electrode to the shield nozzle. The blow-back arc starting method is similar to stick welding. For example, similar to a welder touching a grounded work-pieced then pulling back the electrode to form an arc, a blow-back torch uses the cutting gas to push the negative (−) cathode electrode away from the shield nozzle. Normally, in the blow-back torch a spring or compressed gas pushes the cathode towards the nozzle so that it resets to the start mode when not in operation.

The '268 plasma torch is a blow-back type torch that uses the contact starting method. Likewise, by depressing a button and/or trigger a current is allowed to flow through the torch and thus the torch is in a dead-short mode. Immediately thereafter, gas flowing within a blow-back contact starting torch pushes upon a piston to move the cathode away from the anode thus forming an arc. Voltage is set based upon the maximum distance the cathode can be pushed back from the anode. There are no means for controlling voltage. Likewise, this type of torch can only be operated in one mode—Plasma Arc. Backflowing material through the anode nozzle is not possible in the '268 plasma torch. Moreover, there is no disclosure of coupling this torch to a solid oxide glow discharge cell.

U.S. Pat. No. 4,463,245 discloses "A plasma torch (40) comprises a handle (41) having an upper end (41B) which houses the components forming a torch body (43). Body (33) incorporates a rod electrode (10) having an end which cooperates with an annular tip electrode (13) to form a spark gap. An ionizable fuel gas is fed to the spark gap via tube (44) within the handle (41), the gas from tube (44) flowing axially along rod electrode (10) and being diverted radially through apertures (16) so as to impinge upon and act as a coolant for a thin-walled portion (14) of the annular tip electrode (13). With this arrangement the heat generated by the electrical arc in the inter-electrode gap is substantially confined to the annular tip portion (13A) of electrode (13) which is both consumable and replaceable in that portion (13A) is secured by screw threads to the adjoining portion (13B) of electrode (13) and which is integral with the thin-walled portion (14)." Once again there is no disclosure of coupling this torch to a solid oxide glow discharge cell.

The following is a list of prior art teachings with respect to starting a torch and modes of operation.

| Pat. No. | Title |
|---|---|
| 2,784,294 | Welding torch |
| 2,898,441 | Arc torch push starting |
| 2,923,809 | Arc cutting of metals |
| 3,004,189 | Combination automatic-starting electrical plasma torch and gas shutoff valve |
| 3,082,314 | Plasma arc torch |
| 3,131,288 | Electric arc torch |
| 3,242,305 | Plasma retract arc torch |
| 3,534,388 | Arc torch cutting process |
| 3,619,549 | Arc torch cutting process |
| 3,641,308 | Plasma arc torch having liquid laminar flow jet for arc constriction |
| 3,787,247 | Water-scrubber cutting table |
| 3,833,787 | Plasma jet cutting torch having reduced noise generating characteristics |
| 4,203,022 | Method and apparatus for positioning a plasma arc cutting torch |
| 4,463,245 | Plasma cutting and welding torches with improved nozzle electrode cooling |
| 4,567,346 | Arc-striking method for a welding or cutting torch and a torch adapted to carry out said method |

High temperature steam electrolysis and glow discharge are two technologies that are currently being viewed as the future for the hydrogen economy. Likewise, coal gasification is being viewed as the technology of choice for reducing carbon, sulfur dioxide and mercury emissions from coal burning power plants. Renewables such as wind turbines, hydro-electric and biomass are being exploited in order to reduce global warming.

Water is one of our most valuable resources. Copious amounts of water are used in industrial processes with the end result of producing wastewater. Water treatment and wastewater treatment go hand in hand with the production of energy.

Therefore, a need exists for a plasma arc torch that can be operated in multiple modes.

SUMMARY OF THE INVENTION

The present invention provides a multi-mode plasma arc torch that includes a cylindrical vessel having a first end and a second end, a first tangential inlet/outlet connected to or proximate to the first end, a second tangential inlet/outlet connected to or proximate to the second end, an electrode housing connected to the first end of the cylindrical vessel such that a first electrode is (a) aligned with a longitudinal axis of the cylindrical vessel, and (b) extends into the cylindrical vessel, and a hollow electrode nozzle connected to the second end of the cylindrical vessel such that the center line of the hollow electrode nozzle is aligned with the longitudinal axis of the cylindrical vessel. Adjusting a position of the electrode with respect to the hollow electrode causes the multi-mode plasma arc torch to operate in a dead short resistive mode, a submerged arc mode, an electrolysis mode, a glow discharge mode or a plasma arc mode.

In addition, the present invention provides a system that includes a plasma arc torch, a pump/compressor and three three-way valves. The multi-mode plasma arc torch includes a cylindrical vessel having a first end and a second end, a first tangential inlet/outlet connected to or proximate to the first end, a second tangential inlet/outlet connected to or proximate to the second end, an electrode housing connected to the first end of the cylindrical vessel such that a first electrode is (a) aligned with a longitudinal axis of the cylindrical vessel, and (b) extends into the cylindrical vessel, and a hollow electrode nozzle connected to the second end of the cylindrical vessel such that the center line of the hollow electrode nozzle is aligned with the longitudinal axis of the cylindrical vessel. Adjusting a position of the electrode with respect to the hollow electrode causes the multi-mode plasma arc torch to operate in a dead short resistive mode, a submerged arc mode, an electrolysis mode, a glow discharge mode or a plasma arc mode. A first three-way valve connected to the first tangential inlet/outlet and a discharge of the pump/compressor. A second three-way valve connected to the second tangential inlet/outlet and a discharge of the pump/compressor. A third three-way valve connected to an exterior end of the hollow electrode nozzle and a discharge of the pump/compressor.

The present invention also provides a method for operating the plasma arc torch and plasma arc torch system in the five operating modes. For example, a method for operating a multi-mode plasma arc torch includes the steps of: (1) providing the multi-mode plasma arc torch comprising a cylindrical vessel having a first end and a second end, a first tangential inlet/outlet connected to or proximate to the first end, a second tangential inlet/outlet connected to or proximate to the second end, an electrode housing connected to the first end of the cylindrical vessel such that a first electrode is (a) aligned with a longitudinal axis of the cylindrical vessel, and (b) extends into the cylindrical vessel, and a hollow electrode nozzle connected to the second end of the cylindrical vessel such that a center line of the hollow electrode nozzle is aligned with the longitudinal axis of the cylindrical vessel, the hollow electrode having a first end disposed within the cylindrical vessel and a second end disposed outside the cylindrical vessel; and (2) operating the multi-mode plasma arc torch in a dead short resistive mode, a submerged arc mode, an electrolysis mode, a glow discharge mode or a plasma arc mode by adjusting a position of the first electrode with respect to the hollow electrode.

Another method for operating a multi-mode plasma arc torch includes the steps of: (1) providing a plasma arc torch comprising a cylindrical vessel having a first end and a second end, a first tangential inlet/outlet connected to or proximate to the first end, a second tangential inlet/outlet connected to or proximate to the second end, an electrode housing connected to the first end of the cylindrical vessel such that a first electrode is (a) aligned with a longitudinal axis of the cylindrical vessel, and (b) extends into the cylindrical vessel, a hollow electrode nozzle connected to the second end of the cylindrical vessel such that a center line of the hollow electrode nozzle is aligned with the longitudinal axis of the cylindrical vessel, the hollow electrode nozzle having a first end disposed within the cylindrical vessel and a second end disposed outside the cylindrical vessel; (2) providing a pump/compressor; (3) providing a first three-way valve connected to the first tangential inlet/outlet and a discharge of the pump/compressor; (4) providing a second three-way valve connected to the second tangential inlet/outlet and the discharge of the pump/compressor; (5) providing a third three-way valve connected to the second end of the hollow electrode nozzle and the discharge of the pump/compressor; and (6) operating the multi-mode plasma arc torch in a dead short resistive mode, a submerged arc mode, an electrolysis mode, a glow discharge mode or a plasma arc mode by adjusting a position of the first electrode with respect to the hollow electrode.

Yet another method for operating a multi-mode plasma arc torch includes the steps of: (1) providing the multi-mode plasma torch comprising a cylindrical vessel having a first end and a second end, a first tangential inlet/outlet connected to or proximate to the first end, a second tangential inlet/outlet connected to or proximate to the second end, an electrode housing connected to the first end of the cylindrical vessel, the electrode housing having a first electrode aligned with a longitudinal axis of the cylindrical vessel, extending into the cylindrical vessel, moveable along the longitudinal axis, and electrically isolated from the cylindrical vessel, a hollow electrode nozzle connected to the second end of the cylindrical vessel such that a center line of the hollow electrode nozzle is aligned with the longitudinal axis of the cylindrical vessel, the hollow electrode nozzle having a first end disposed within the cylindrical vessel and a second end disposed outside the cylindrical vessel, and a linear actuator operably connected to the first electrode to adjust a position of the first electrode with respect to the hollow electrode nozzle; and (2) operating the multi-mode plasma arc torch in a dead short resistive mode, a submerged arc mode, an electrolysis mode, a glow discharge mode or a plasma arc mode by adjusting the position of the first electrode with respect to the hollow electrode nozzle using the linear actuator.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 10 is a table showing the results of the tailings pond water and solids analysis treated with one embodiment of the present invention;

FIG. 12 is illustrates the first electrode positions to operate a Multi-Mode Plasma Arc Torch in accordance with another embodiment of the present invention;

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Figure 1:
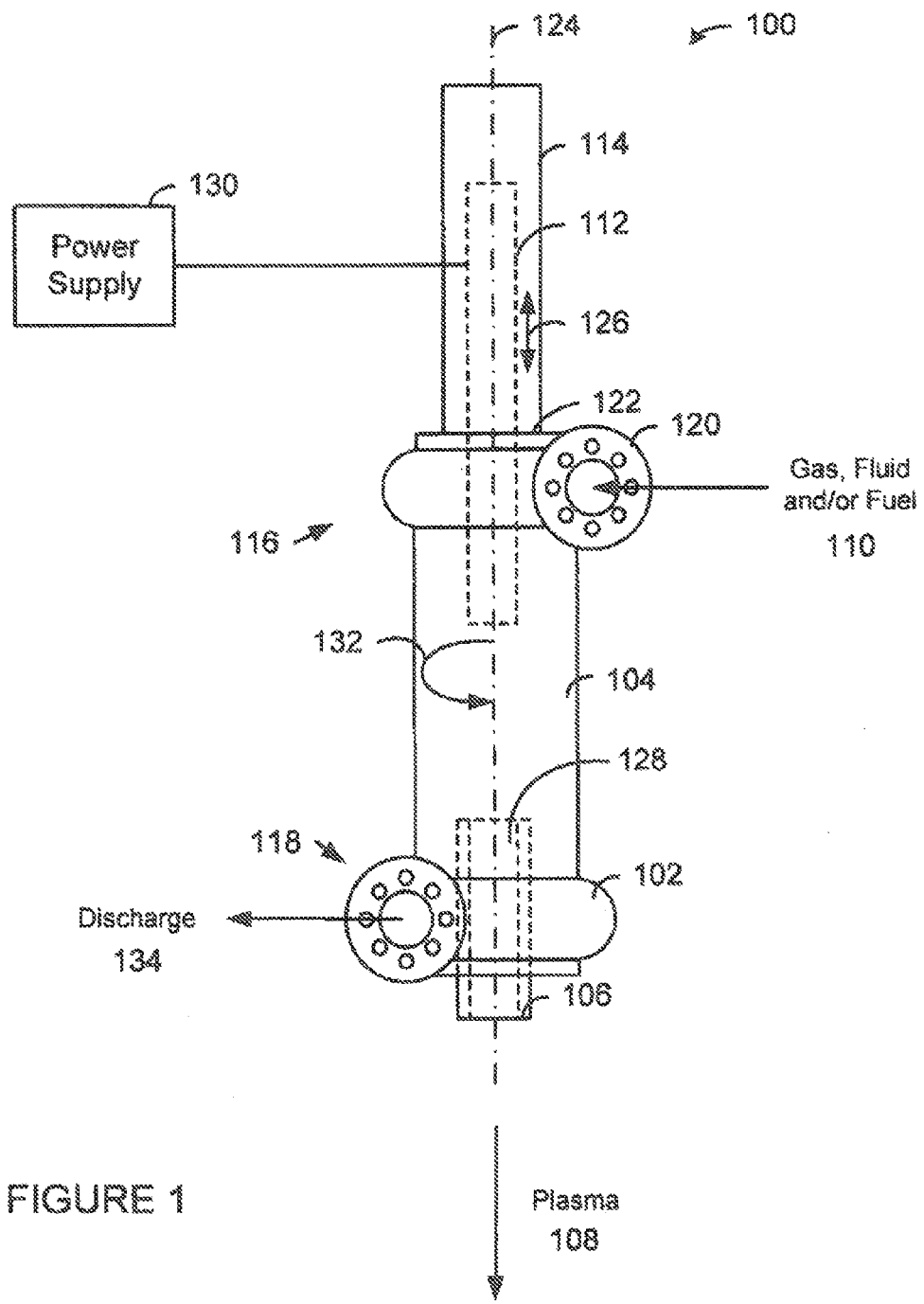
FIG. 1 is a diagram of a plasma arc torch in accordance with one embodiment of the present invention.

Now referring to FIG. 1, a plasma arc torch 100 in accordance with one embodiment of the present invention is shown. The plasma arc torch 100 is a modified version of the ARCWHIRL® device disclosed in U.S. Pat. No. 7,422,695 (which is hereby incorporated by reference in its entirety) that produces unexpected results. More specifically, by attaching a discharge volute 102 to the bottom of the vessel 104, closing off the vortex finder, replacing the bottom electrode with a hollow electrode nozzle 106, an electrical arc can be maintained while discharging plasma 108 through the hollow electrode nozzle 106 regardless of how much gas (e.g., air), fluid (e.g., water) or steam 110 is injected into plasma arc torch 100. In addition, when a valve (not shown) is connected to the discharge volute 102, the mass flow of plasma 108 discharged from the hollow electrode nozzle 106 can be controlled by throttling the valve (not shown) while adjusting the position of the first electrode 112 using the linear actuator 114.

As a result, plasma arc torch 100 includes a cylindrical vessel 104 having a first end 116 and a second end 118. A tangential inlet 120 is connected to or proximate to the first end 116 and a tangential outlet 102 (discharge volute) is connected to or proximate to the second end 118. An electrode housing 122 is connected to the first end 116 of the cylindrical vessel 104 such that a first electrode 112 is aligned with the longitudinal axis 124 of the cylindrical vessel 104, extends into the cylindrical vessel 104, and can be moved along the longitudinal axis 124. Moreover, a linear actuator 114 is connected to the first electrode 112 to adjust the position of the first electrode 112 within the cylindrical vessel 104 along the longitudinal axis of the cylindrical vessel 124 as indicated by arrows 126. The hollow electrode nozzle 106 is connected to the second end 118 of the cylindrical vessel 104 such that the center line of the hollow electrode nozzle 106 is aligned with the longitudinal axis 124 of the cylindrical vessel 104. The shape of the hollow portion 128 of the hollow electrode nozzle 106 can be cylindrical or conical. Moreover, the hollow electrode nozzle 106 can extend to the second end 118 of the cylindrical vessel 104 or extend into the cylindrical vessel 104 as shown. As shown in FIG. 1, the tangential inlet 120 is volute attached to the first end 116 of the cylindrical vessel 104, the tangential outlet 102 is a volute attached to the second end 118 of the cylindrical vessel 104, the electrode housing 122 is connected to the inlet volute 120, and the hollow electrode nozzle 106 (cylindrical configuration) is connected to the discharge volute 102. Note that the plasma arc torch 100 is not shown to scale.

A power supply 130 is electrically connected to the plasma arc torch 100 such that the first electrode 112 serves as the cathode and the hollow electrode nozzle 106 serves as the anode. The voltage, power and type of the power supply 130 is dependant upon the size, configuration and function of the plasma arc torch 100. A gas (e.g., air), fluid (e.g., water) or steam 110 is introduced into the tangential inlet 120 to form a vortex 132 within the cylindrical vessel 104 and exit through the tangential outlet 102 as discharge 134. The vortex 132 confines the plasma 108 within in the vessel 104 by the inertia (inertial confinement as opposed to magnetic confinement) caused by the angular momentum of the vortex, whirling, cyclonic or swirling flow of the gas (e.g., air), fluid (e.g., water) or steam 110 around the interior of the cylindrical vessel 104. During startup, the linear actuator 114 moves the first electrode 112 into contact with the hollow electrode nozzle 106 and then draws the first electrode 112 back to create an electrical arc which forms the plasma 108 that is discharged through the hollow electrode nozzle 106. During operation, the linear actuator 114 can adjust the position of the first electrode 112 to change the plasma 108 discharge or account for extended use of the first electrode 112.

Figure 2:
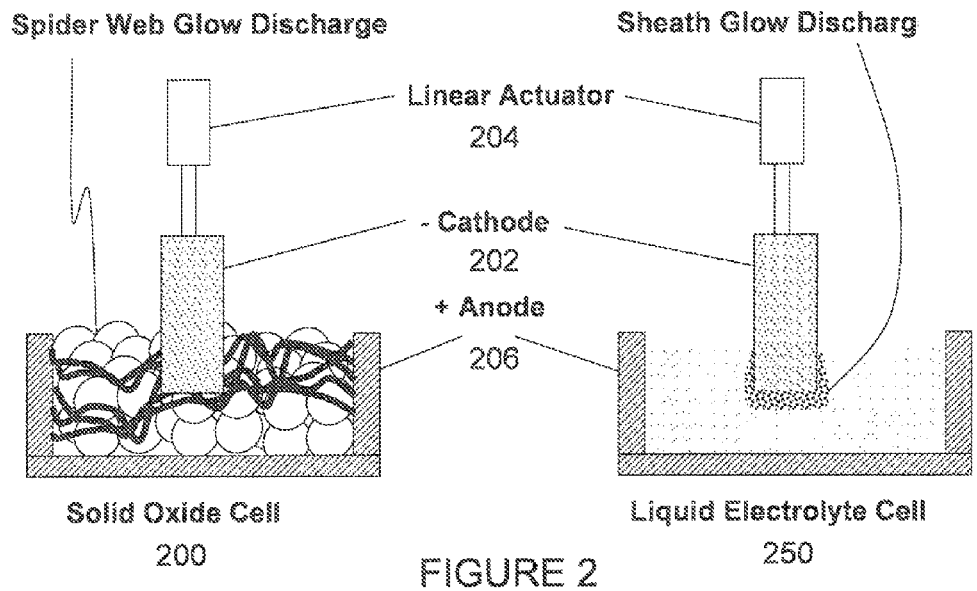
FIG. 2 is a cross-sectional view comparing and contrasting a solid oxide cell to a liquid electrolyte cell in accordance with one embodiment of the present invention.

Referring now to FIG. 2, a cross-sectional view comparing and contrasting a solid oxide cell 200 to a liquid electrolyte cell 250 in accordance with one embodiment of the present invention is shown. An experiment was conducted using the Liquid Electrolyte Cell 250. A carbon cathode 202 was connected a linear actuator 204 in order to raise and lower the cathode 202 into a carbon anode crucible 206. An ESAB ESP 150 DC power supply rated at 150 amps and an open circuit voltage ("OCV") of 370 VDC was used for the test. The power supply was "tricked out" in order to operate at OCV.

In order to determine the sheath glow discharge length on the cathode 202 as well as measure amps and volts the power supply was turned on and then the linear actuator 204 was used to lower the cathode 202 into an electrolyte solution of water and baking soda. Although a steady glow discharge could be obtained the voltage and amps were too erratic to record. Likewise, the power supply constantly surged and pulsed due to erratic current flow. As soon as the cathode 202 was lowered too deep, the glow discharge ceased and the cell went into an electrolysis mode. In addition, since boiling would occur quite rapidly and the electrolyte would foam up and go over the sides of the carbon crucible 206, foundry sand was added reduce the foam in the crucible 206.

The 8" diameter anode crucible 206 was filled with sand and the electrolyte was added to the crucible. Power was turned on and the cathode 202 was lowered into the sand and electrolyte. Unexpectedly, a glow discharge was formed immediately, but this time it appeared to spread out laterally from the cathode 202. A large amount of steam was produced such that it could not be seen how far the glow discharge had extended through the sand.

Figure 3:
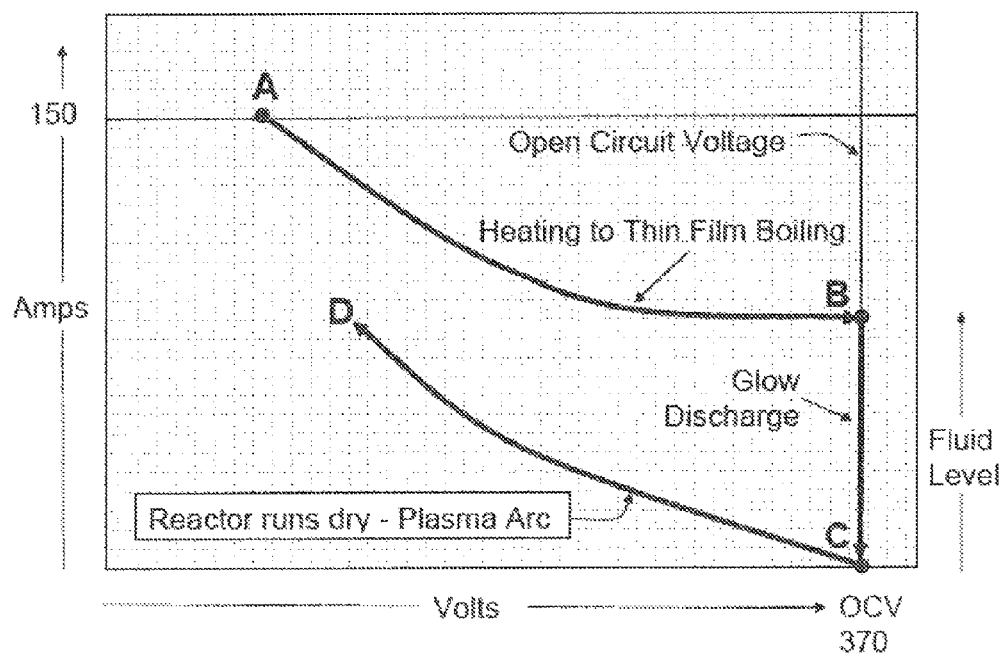
FIG. 3 is a graph showing an operating curve a glow discharge cell in accordance with one embodiment of the present invention.

Next, the sand was replaced with commonly available clear floral marbles. When the cathode 202 was lowered into the marbles and baking soda/water solution, the electrolyte began to slowly boil. As soon as the electrolyte began to boil a glow discharge spider web could be seen throughout the marbles as shown the Solid Oxide Cell 200. Although this was completely unexpected at a much lower voltage than what has been disclosed and published, what was completely unexpected is that the DC power supply did not surge, pulse or operate erratically in any way. A graph showing an operating curve for a glow discharge cell in accordance with the present invention is shown in FIG. 3 based on various tests. The data is completely different from what is currently published with respect to glow discharge graphs and curves developed from currently known electro-plasma, plasma electrolysis or glow discharge reactors. Glow discharge cells can evaporate or concentrate liquids while generating steam.

Figure 4:
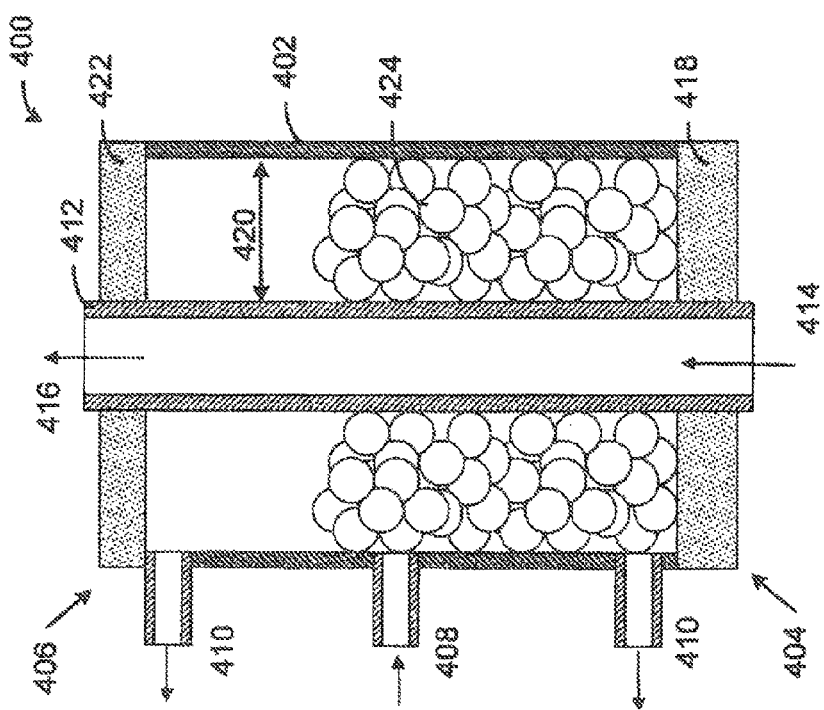
FIG. 4 is a cross-sectional view of a glow discharge cell in accordance with one embodiment of the present invention.

Now referring to FIG. 4, a cross-sectional view of a glow discharge cell 400 in accordance with one embodiment of the present invention is shown. The glow discharge cell 400 includes an electrically conductive cylindrical vessel 402 having a first end 404 and a second end 406, and at least one inlet 408 and one outlet 410. A hollow electrode 412 is aligned with a longitudinal axis of the cylindrical vessel 402 and extends at least from the first end 404 to the second end 406 of the cylindrical vessel 402. The hollow electrode 412 also has an inlet 414 and an outlet 416. A first insulator 418 seals the first end 404 of the cylindrical vessel 402 around the hollow electrode 412 and maintains a substantially equidistant gap 420 between the cylindrical vessel 402 and the hollow electrode 412. A second insulator 422 seals the second end 406 of the cylindrical vessel 402 around the hollow electrode 412 and maintains the substantially equidistant gap 420 between the cylindrical vessel 402 and the hollow electrode 412. A non-conductive granular material 424 is disposed within the gap 420, wherein the non-conductive granular material 424 (a) allows an electrically conductive fluid to flow between the cylindrical vessel 402 and the hollow electrode 412, and (b) prevents electrical arcing between the cylindrical vessel 402 and the hollow electrode 412 during a electric glow discharge. The electric glow discharge is created whenever: (a) the glow discharge cell 400 is connected to an electrical power source such that the cylindrical vessel 402 is an anode and the hollow electrode 412 is a cathode, and (b) the electrically conductive fluid is introduced into the gap 420.

The vessel 402 can be made of stainless steel and the hollow electrode can be made of carbon. The non-conductive granular material 424 can be marbles, ceramic beads, molecular sieve media, sand, limestone, activated carbon, zeolite, zirconium, alumina, rock salt, nut shell or wood chips. The electrical power supply can operate in a range from 50 to 500 volts DC, or a range of 200 to 400 volts DC. The cathode 412 can reach a temperature of at least 500° C., at least 1000° C., or at least 2000° C. during the electric glow discharge. The electrically conductive fluid comprises water, produced water, wastewater, tailings pond water, or other suitable fluid. The electrically conductive fluid can be created by adding an electrolyte, such as baking soda, Nahcolite, lime, sodium chloride, ammonium sulfate, sodium sulfate or carbonic acid, to a fluid.

Figure 5:
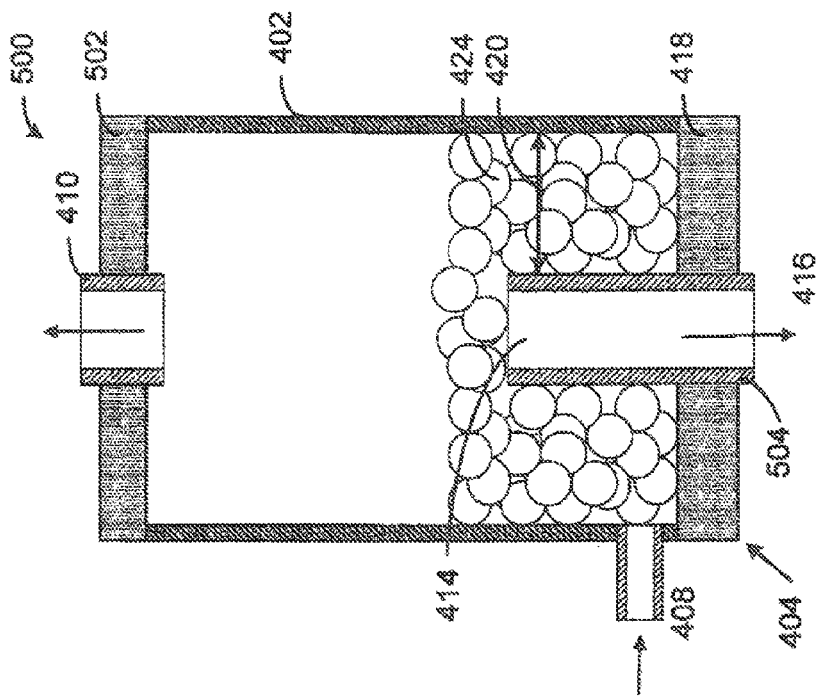
FIG. 5 is a cross-sectional view of a glow discharge cell in accordance with another embodiment of the present invention.

Referring now to FIG. 5, a cross-sectional view of a glow discharge cell 500 in accordance with another embodiment of the present invention is shown. The glow discharge cell 500 includes an electrically conductive cylindrical vessel 402 having a first end 404 and a closed second end 502, an inlet proximate 408 to the first end 404, and an outlet 410 centered in the closed second end 502. A hollow electrode 504 is aligned with a longitudinal axis of the cylindrical vessel and extends at least from the first end 404 into the cylindrical vessel 402. The hollow electrode 504 has an inlet 414 and an outlet 416. A first insulator 418 seals the first end 404 of the cylindrical vessel 402 around the hollow electrode 504 and maintains a substantially equidistant gap 420 between the cylindrical vessel 402 and the hollow electrode 504. A non-conductive granular material 424 is disposed within the gap 420, wherein the non-conductive granular material 424 (a) allows an electrically conductive fluid to flow between the cylindrical vessel 402 and the hollow electrode 504, and (b) prevents electrical arcing between the cylindrical vessel 402 and the hollow electrode 504 during a electric glow discharge. The electric glow discharge is created whenever: (a) the glow discharge cell 500 is connected to an electrical power source such that the cylindrical vessel 402 is an anode and the hollow electrode 504 is a cathode, and (b) the electrically conductive fluid is introduced into the gap 420.

The following examples will demonstrate the capabilities, usefulness and completely unobvious and unexpected results.

EXAMPLE 1

Black Liquor

Figure 6:
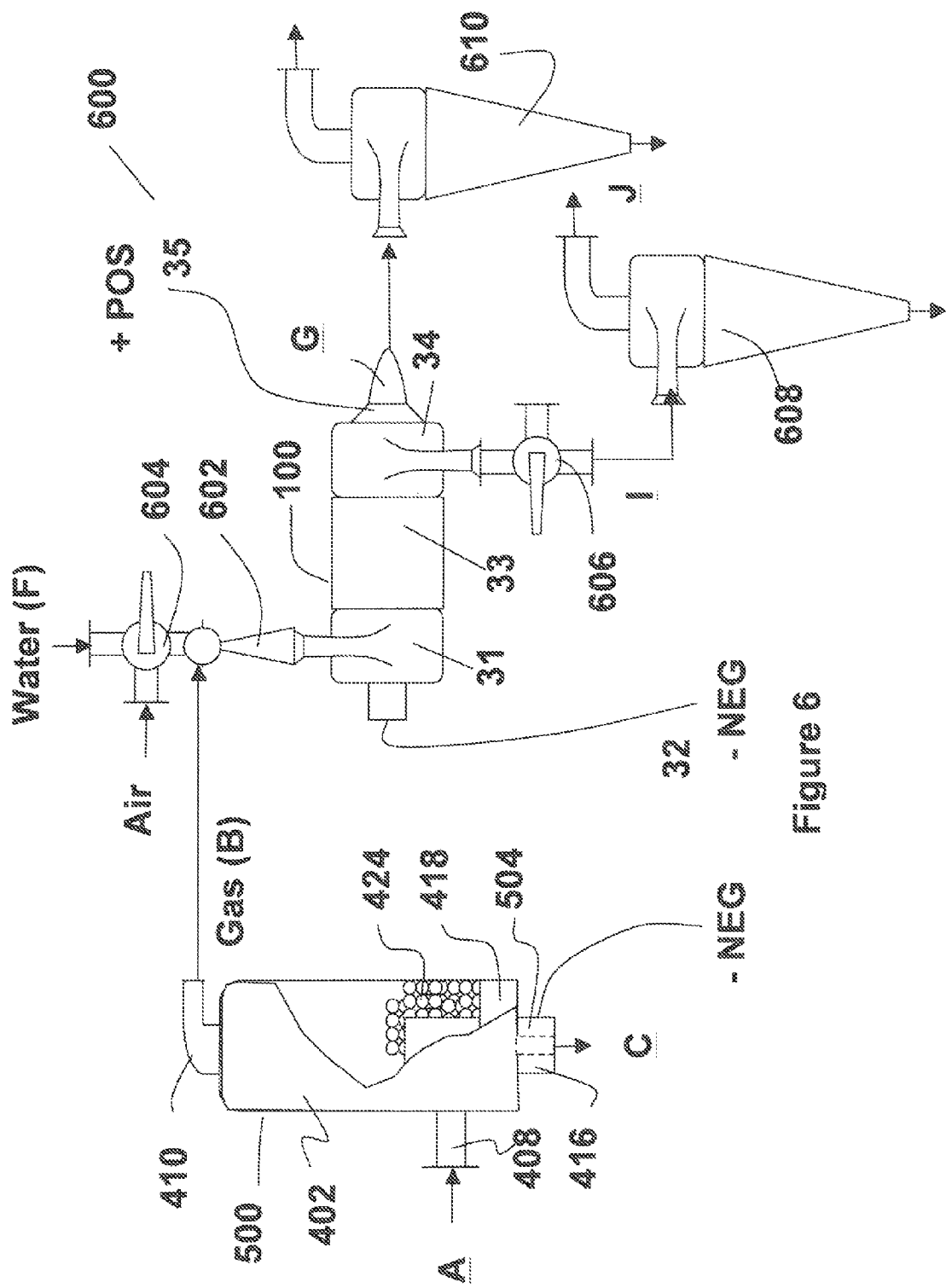
FIG. 6 is a cross-sectional view of a Solid Oxide Plasma Arc Torch System in accordance with another embodiment of the present invention.

Now referring to FIG. 6, a cross-sectional view of a Solid Oxide Plasma Arc Torch System 600 in accordance with another embodiment of the present invention is shown. A plasma arc torch 100 is connected to the cell 500 via an eductor 602. Once again the cell 500 was filled with a baking soda and water solution. A pump was connected to the first volute 31 of the plasma arc torch 100 via a 3-way valve 604 and the eductor 602. The eductor 602 pulled a vacuum on the cell 500. The plasma exiting from the plasma arc torch 100 dramatically increased in size. Hence, a non-condensable gas B was produced within the cell 500. The color of the arc within the plasma arc torch 100 when viewed through the sightglass 33 changed colors due to the gases produced from the HiTemper™ cell 500. Next, the 3-way valve 604 was adjusted to allow air and water F to flow into the first volute 31 of plasma arc torch 100. The additional mass flow increased the plasma G exiting from the plasma arc torch 100. Several pieces of stainless steel round bar were placed at the tip of the plasma G and melted to demonstrate the systems capabilities. Likewise, wood was carbonized by placing it within the plasma stream G. Thereafter the plasma G exiting from the plasma torch 100 was directed into cyclone separator 610. The water and gases I exiting from the plasma arc torch 100 via second volute 34 flowed into a hydrocyclone 608 via a valve 606. This allowed for rapid mixing and scrubbing of gases with the water in order to reduce the discharge of any hazardous contaminants.

A sample of black liquor with 16% solids obtained from a pulp and paper mill was charged to the glow discharge cell 500 in a sufficient volume to cover the floral marbles 424. In contrast to other glow discharge or electro plasma systems the solid oxide glow discharge cell does not require preheating of the electrolyte. The ESAB ESP 150 power supply was turned on and the volts and amps were recorded by hand. Referring briefly to FIG. 3, as soon as the power was turned on to the cell 500, the amp meter pegged out at 150. Hence, the name of the ESAB power supply—ESP 150. It is rated at 150 amps. The voltage was steady between 90 and 100 VDC. As soon as boiling occurred the voltage steadily climbed to OCV (370 VDC) while the amps dropped to 75.

The glow discharge cell 500 was operated until the amps fell almost to zero. Even at very low amps of less than 10 the voltage appeared to be locked on at 370 VDC. The cell 500 was allowed to cool and then opened to examine the marbles 424. It was surprising that there was no visible liquid left in the cell 500 but all of the marbles 424 were coated or coked with a black residue. The marbles 424 with the black residue were shipped off for analysis. The residue was in the bottom of the container and had come off of the marbles 424 during shipping. The analysis is listed in the table below, which demonstrates a novel method for concentrating black liquor and coking organics. With a starting solids concentration of 16%, the solids were concentrated to 94.26% with only one evaporation step. Note that the sulfur ("S") stayed in the residue and did not exit the cell 500.

TABLE

Black Liquor Results
Total Solids % 94.26
Ash %/ODS 83.64
ICP metal scan: results are reported on ODS basis

| Metal Scan | Unit | F80015 |
| --- | --- | --- |
| Aluminum, Al | mg/kg | 3590* |
| Arsenic, As | mg/kg | <50 |
| Barium, Ba | mg/kg | 2240* |
| Boron, B | mg/kg | 60 |
| Cadmium, Cd | mg/kg | 2 |
| Calcium, Ca | mg/kg | 29100* |
| Chromium, Cr | mg/kg | 31 |
| Cobalt, Co | mg/kg | <5 |
| Copper, Cu | mg/kg | 19 |
| Iron, Fe | mg/kg | 686* |
| Lead, Pb | mg/kg | <20 |
| Lithium, Li | mg/kg | 10 |
| Magnesium, Mg | mg/kg | 1710* |
| Manganese, Mn | mg/kg | 46.2 |
| Molybdenum, Mo | mg/kg | 40 |
| Nickel, Ni | mg/kg | <100 |
| Phosphorus, P | mg/kg | 35 |
| Potassium, K | mg/kg | 7890 |
| Silicon, Si | mg/kg | 157000* |
| Sodium, Na | mg/kg | 102000 |
| Strontium, Sr | mg/kg | <20 |
| Sulfur, S | mg/kg | 27200* |
| Titanium, Ti | mg/kg | 4 |
| Vanadium, V | mg/kg | 1.7 |
| Zinc, Zn | mg/kg | 20 |

This method can be used for concentrating black liquor from pulp, paper and fiber mills for subsequent recaustizing.

As can be seen in FIG. 3, if all of the liquid evaporates from the cell 500 and it is operated only with a solid electrolyte, electrical arc over from the cathode to anode may occur. This has been tested in which case a hole was blown through the stainless steel vessel 402. Electrical arc over can easily be prevented by (1) monitoring the liquid level in the cell and do not allow it to run dry, and (2) monitoring the amps (Low amps=Low liquid level). If electrical arc over is desirable or the cell must be designed to take an arc over, then the vessel 402 should be constructed of carbon.

EXAMPLE 2

Arcwhirl® Plasma Torch Attached to Solid Oxide Cell

Figure 7:
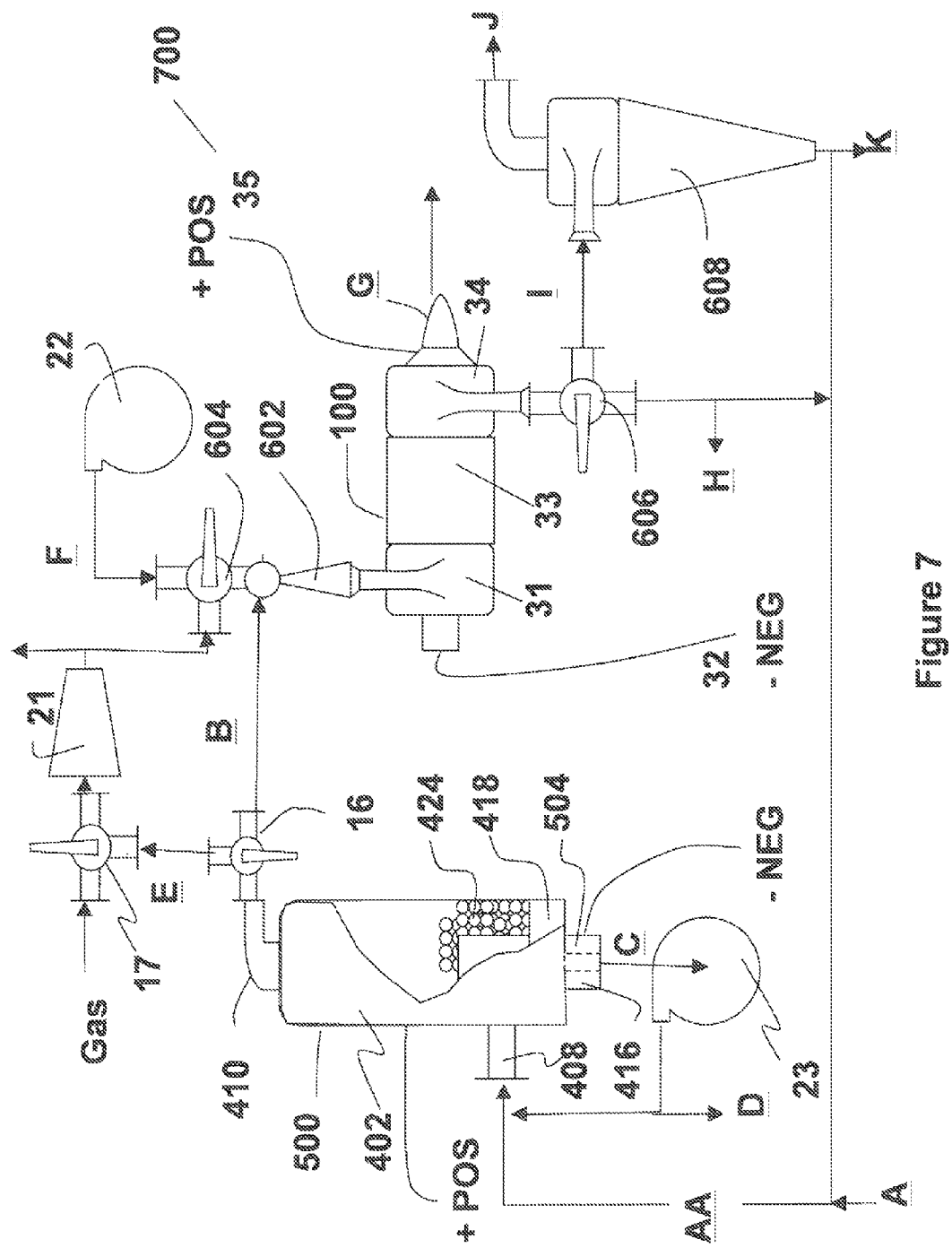
FIG. 7 is a cross-sectional view of a Solid Oxide Plasma Arc Torch System in accordance with another embodiment of the present invention.

Referring now to FIG. 7, a cross-sectional view of a Solid Oxide Plasma Arc Torch System 700 in accordance with another embodiment of the present invention is shown. A plasma arc torch 100 is connected to the cell 500 via an eductor 602. Once again the cell 500 was filled with a baking soda and water solution. Pump 23 recirculates the baking soda and water solution from the outlet 416 of the hollow electrode 504 to the inlet 408 of the cell 500. A pump 22 was connected to the first volute 31 of the plasma arc torch 100 via a 3-way valve 604 and the eductor 602. An air compressor 21 was used to introduce air into the 3-way valve 604 along with water F from the pump 22. The pump 22 was turned on and water F flowed into the first volute 31 of the plasma arc torch 100 and through a full view site glass 33 and exited the torch 30 via a second volute 34. The plasma arc torch 100 was started by pushing a carbon cathode rod (−NEG) 32 to touch and dead short to a positive carbon anode (+POS) 35. A very small plasma G exited out of the anode 35. Next, the High Temperature Plasma Electrolysis Reactor (Cell) 500 was started in order to produce a plasma gas B. Once again at the onset of boiling voltage climbed to OCV (370 VDC) and a gas began flowing to the plasma arc torch 100. The eductor 602 pulled a vacuum on the cell 500. The plasma G exiting from the plasma arc torch 100 dramatically increased in size. Hence, a non-condensable gas B was produced within the cell 500. The color of the arc within the plasma arc torch 100 when viewed through the sightglass 33 changed colors due to the gases produced from the HiTemper™ cell 500. Next, the 3-way valve 604 was adjusted to allow air from compressor 21 and water from pump 22 to flow into the plasma arc torch 100. The additional mass flow increased the plasma G exiting from the plasma arc torch 100. Several pieces of stainless steel round bar were placed at the tip of the plasma G and melted to demonstrate the systems capabilities. Likewise, wood was carbonized by placing it within the plasma stream G. The water and gases exiting from the plasma arc torch 100 via volute 34 flowed into a hydrocyclone 608. This allowed for rapid mixing and scrubbing of gases with the water in order to reduce the discharge of any hazardous contaminants.

Next, the system was shut down and a second cyclone separator 610 was attached to the plasma arc torch 100 as shown in FIG. 5. Once again the Solid Oxide Plasma Arc Torch System was turned on and a plasma G could be seen circulating within the cyclone separator 610. Within the eye or vortex of the whirling plasma G was a central core devoid of any visible plasma.

The cyclone separator 610 was removed to conduct another test. To determine the capabilities of the Solid Oxide Plasma Arc Torch System as shown in FIG. 6, the pump 22 was turned off and the system was operated only on air provided by compressor 21 and gases B produced from the solid oxide cell 500. Next, 3-way valve 606 was slowly closed in order to force all of the gases through the arc to form a large plasma G exiting from the hollow carbon anode 35.

Next, the 3-way valve 604 was slowly closed to shut the flow of air to the plasma arc torch 100. What happened was completely unexpected. The intensity of the light from the sightglass 33 increased dramatically and a brilliant plasma was discharged from the plasma arc torch 100. When viewed with a welding shield the arc was blown out of the plasma arc torch 100 and wrapped back around to the anode 35. Thus, the Solid Oxide Plasma Arc Torch System will produce a gas and a plasma suitable for welding, melting, cutting, spraying and chemical reactions such as pyrolysis, gasification and water gas shift reaction.

EXAMPLE 3

Phosphogypsum Pond Water

The phosphate industry has truly left a legacy in Florida, Louisiana and Texas that will take years to cleanup—gypsum stacks and pond water. On top of every stack is a pond. Pond water is recirculated from the pond back down to the plant and slurried with gypsum to go up the stack and allow the gypsum to settle out in the pond. This cycle continues and the gypsum stack increases in height. The gypsum is produced as a byproduct from the ore extraction process.

There are two major environmental issues with every gyp stack. First, the pond water has a very low pH. It cannot be discharged without neutralization. Second, the phosphogypsum contains a slight amount of radon. Thus, it cannot be used or recycled to other industries. The excess water in combination with ammonia contamination produced during the production of $P_2O_5$ fertilizers such as diammonium phosphate ("DAP") and monoammonium phosphate ("MAP") must be treated prior to discharge. The excess pond water contains about 2% phosphate a valuable commodity.

A sample of pond water was obtained from a Houston phosphate fertilizer company. The pond water was charged to the solid oxide cell 500. The Solid Oxide Plasma Arc Torch System was configured as shown in FIG. 6. The 3-way valve 606 was adjusted to flow only air into the plasma arc torch 100 while pulling a vacuum on cell 500 via eductor 602. The hollow anode 35 was blocked in order to maximize the flow of gases I to hydrocyclone 608 that had a closed bottom with a small collection vessel. The hydrocyclone 608 was immersed in a tank in order to cool and recover condensable gases.

The results are disclosed in FIG. 10—Tailings Pond Water Results. The goal of the test was to demonstrate that the Solid Oxide Glow Discharge Cell could concentrate up the tailings pond water. Turning now to cycles of concentration, the percent $P_2O_5$ was concentrated up by a factor of 4 for a final concentration of 8.72% in the bottom of the HiTemper™ cell 500. The beginning sample as shown in the picture is a colorless, slightly cloudy liquid. The bottoms or concentrate recovered from the HiTemper cell 500 was a dark green liquid with sediment. The sediment was filtered and are reported as SOLIDS (Retained on Whatmann #40 filter paper). The percent $SO_4$ recovered as a solid increased from 3.35% to 13.6% for a cycles of concentration of 4. However, the percent Na recovered as a solid increased from 0.44% to 13.67% for a cycles of concentration of 31.

The solid oxide or solid electrolyte 424 used in the cell 500 were floral marbles (Sodium Oxide). Floral marbles are made of sodium glass. Not being bound by theory it is believed that the marbles were partially dissolved by the phosphoric acid in combination with the high temperature glow discharge. Chromate and Molydemun cycled up and remained in solution due to forming a sacrificial anode from the stainless steel vessel 402. Note: Due to the short height of the cell carryover occurred due to pulling a vacuum on the cell 500 with eductor 602. In the first run (row 1 HiTemper) of FIG. 10 very little fluorine went overhead. That had been a concern from the beginning that fluorine would go over head. Likewise about 38% of the ammonia went overhead. It was believed that all of the ammonia would flash and go overhead.

A method has been disclosed for concentrating $P_2O_5$ from tailings pond for subsequent recovery as a valuable commodity acid and fertilizer.

Now, returning back to the black liquor sample, not being bound by theory it is believed that the black liquor can be recaustisized by simply using CaO or limestone as the solid oxide electrolyte 424 within the cell 500. Those who are skilled in the art of producing pulp and paper will truly understand the benefits and cost savings of not having to run a lime kiln. However, if the concentrated black liquor must be gasified or thermally oxidized to remove all carbon species, the marbles 424 can be treated with the plasma arc torch 100.

Referring back to FIG. 6, the marbles 424 coated with the concentrated black liquor or the concentrated black liquor only is injected between the plasma arc torch 100 and the cyclone separator 610. This will convert the black liquor into a green liquor or maybe a white liquor. The marbles 424 may be flowed into the plasma arc torch nozzle 31 and quenched in the whirling lime water and discharged via volute 34 into hydrocyclone 608 for separation and recovery of both white liquor and the marbles 424. The lime will react with the NaO to form caustic and an insoluble calcium carbonate precipitate.

EXAMPLE 4

Evaporation, Vapor Compression and Steam Generation for EOR and Industrial Steam Users Turning to FIG. 4, several oilfield wastewaters were evaporated in the cell 400. In order to enhance evaporation the suction side of a vapor compressor (not shown) can be connected to upper outlet 410. The discharge of the vapor compressor would be connected to 416. Not being bound by theory, it is believed that alloys such as Kanthal® manufactured by the Kanthal® corporation may survive the intense effects of the cell as a tubular cathode 412, thus allowing for a novel steam generator with a superheater by flowing the discharge of the vapor compressor through the tubular cathode 412. Such an apparatus, method and process would be widely used throughout the upstream oil and gas industry in order to treat oilfield produced water and frac flowback.

Several different stainless steel tubulars were tested within the cell 500 as the cathode 12. In comparison to the sheath glow discharge the tubulars did not melt. In fact, when the tubulars were pulled out, a marking was noticed at every point a marble was in contact with the tube.

This gives rise to a completely new method for using glow discharge to treat metals.

EXAMPLE 5

Treating Tubes, Bars, Rods, Pipe or Wire

There are many different companies applying glow discharge to treat metal. However, many have companies have failed miserably due to arcing over and melting the material to be coated, treated or descaled. The problem with not being able to control voltage leads to spikes. By simply adding sand or any solid oxide to the cell and feeding the tube cathode 12 through the cell 500 as configured in FIG. 2, the tube, rod, pipe, bars or wire can be treated at a very high feedrate.

EXAMPLE 6

Solid Oxide Plasma Arc Torch

There truly exists a need for a very simple plasma torch that can be operated with dirty or highly polluted water such as sewage flushed directly from a toilet which may contain toilet paper, feminine napkins, fecal matter, pathogens, urine and pharmaceuticals. A plasma torch system that could operate on the aforementioned waters could potentially dramatically affect the wastewater infrastructure and future costs of maintaining collection systems, lift stations and wastewater treatment facilities.

By converting the contaminated wastewater to a gas and using the gas as a plasma gas could also alleviate several other growing concerns—municipal solid waste going to landfills, grass clippings and tree trimmings, medical waste, chemical waste, refinery tank bottoms, oilfield wastes such as drill cuttings and typical everyday household garbage. A simple torch system which could handle both solid waste and liquids or that could heat a process fluid while gasifying biomass or coal or that could use a wastewater to produce a plasma cutting gas would change many industries overnight.

One industry in particular is the metals industry. The metals industry requires a tremendous amount of energy and exotic gases for heating, melting, welding, cutting and machining.

Figure 8:
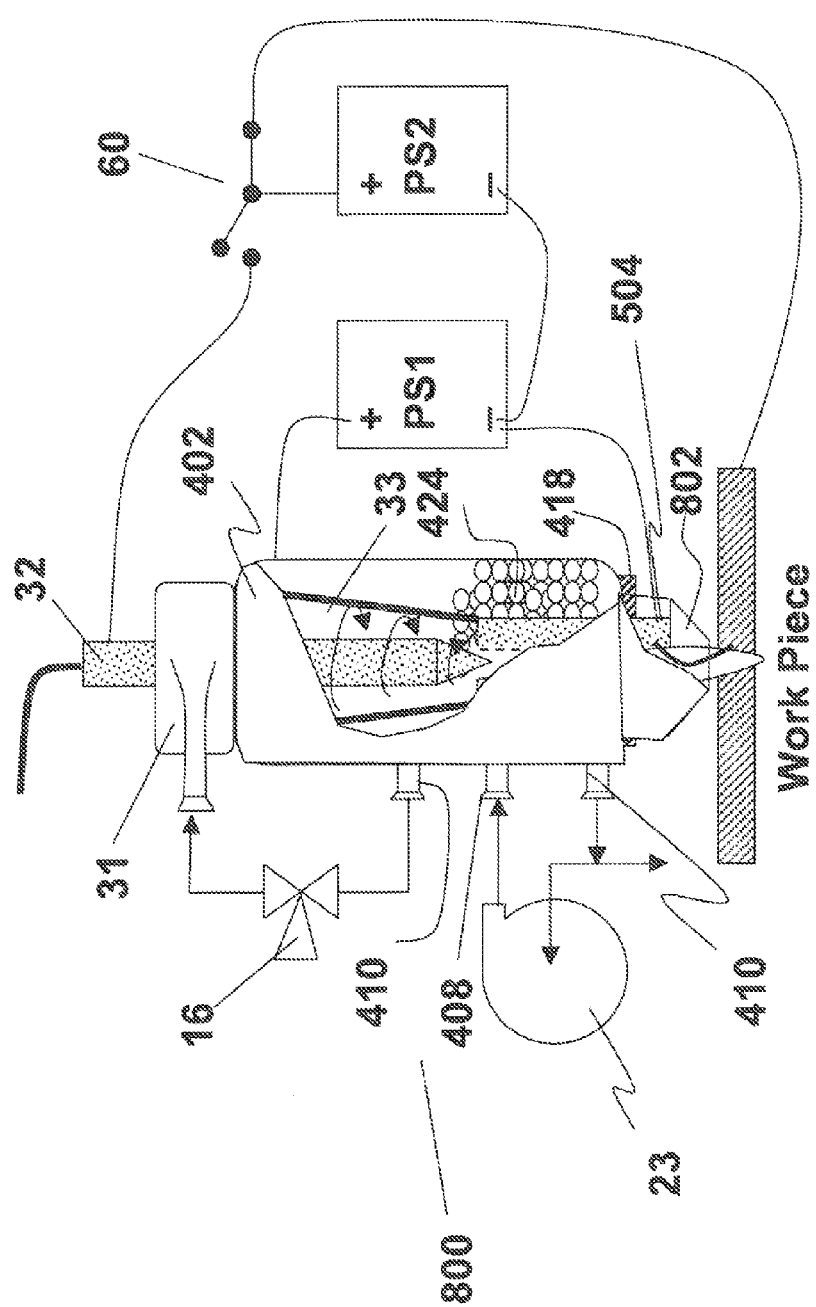
FIG. 8 is a cross-sectional view of a Solid Oxide Transferred Arc Plasma Torch in accordance with another embodiment of the present invention.
Figure 9:
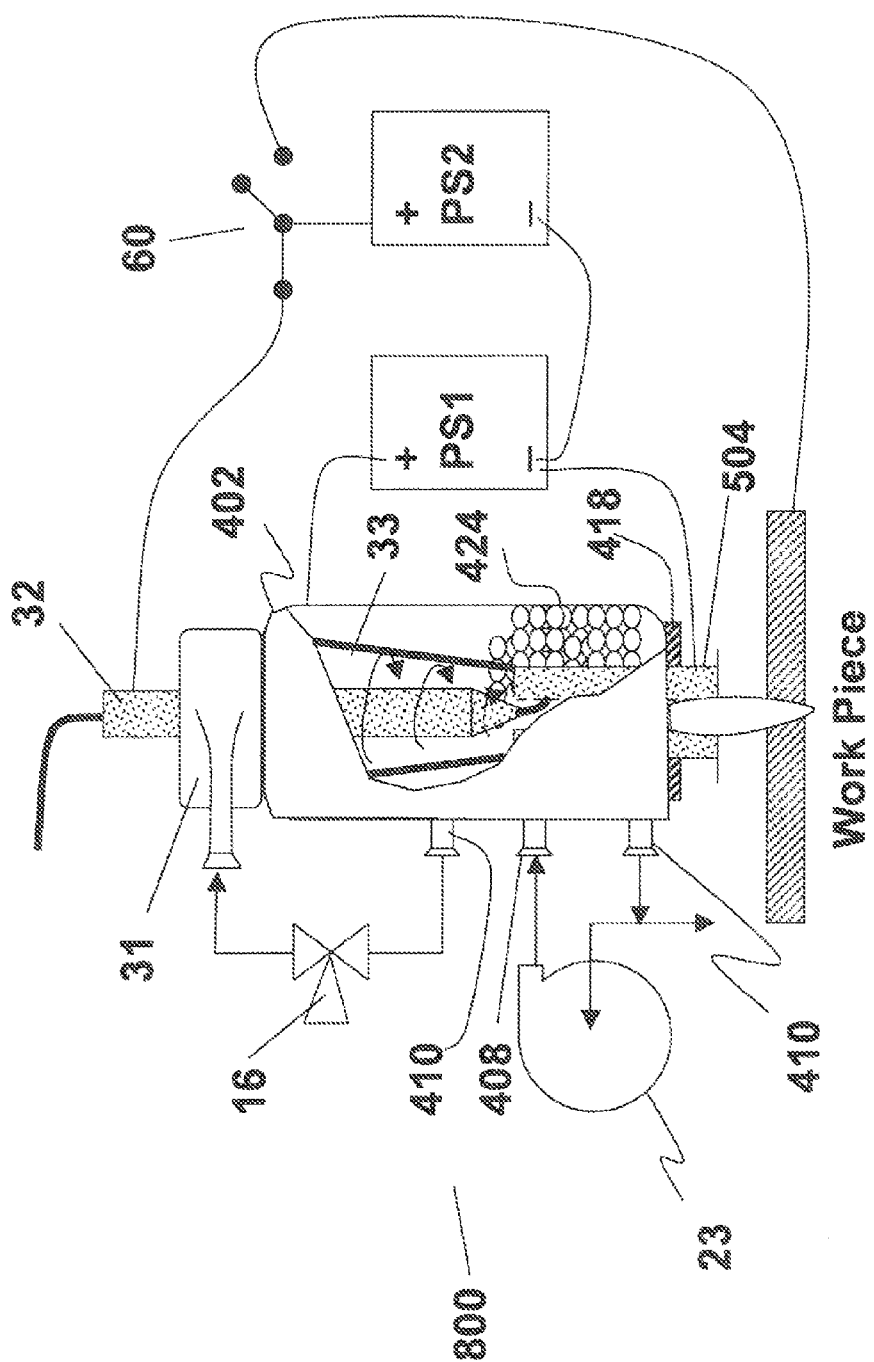
FIG. 9 is a cross-sectional view of a Solid Oxide Non-Transferred Arc Plasma Torch in accordance with another embodiment of the present invention.

Turning now to FIGS. 8 and 9, a truly novel plasma torch 800 will be disclosed in accordance with the preferred embodiments of the present invention. First, the Solid Oxide Plasma Torch is constructed by coupling the plasma arc torch 100 to the cell 500. The plasma arc torch volute 31 and electrode 32 are detached from the eductor 602 and sightglass 33. The plasma arc torch volute 31 and electrode assembly 32 are attached to the cell 500 vessel 402. The sightglass 33 is replaced with a concentric type reducer 33. It is understood that the electrode 32 is electrically isolated from the volute 31 and vessel 402. The electrode 32 is connected to a linear actuator (not shown) in order to strike the arc.

Continuous Operation of the Solid Oxide Transferred Arc Plasma Torch 800 as shown in FIG. 8 will now be disclosed for cutting or melting an electrically conductive workpiece. A fluid is flowed into the suction side of the pump and into the cell 500. The pump is stopped. A first power supply PS1 is turned on thus energizing the cell 500. As soon as the cell 500 goes into glow discharge and a gas is produced valve 16 opens allowing the gas to enter into the volute 31. The volute 31 imparts a whirl flow to the gas. A switch 60 is positioned such that a second power supply PS2 is connected to the workpiece and the −negative side of PS2 is connected to the −negative of PS1 which is connected to the centered cathode 504 of the cell 500. The entire torch is lowered so that an electrically conductive nozzle 13-C touches and is grounded to the workpiece. PS2 is now energized and the torch is raised from the workpiece. An arc is formed between cathode 504 and the workpiece.

Centering the Arc—If the arc must be centered for cutting purposes, then PS2's −negative lead would be attached to the lead of switch 60 that goes to the electrode 32. Although a series of switches are not shown for this operation, it will be understood that in lieu of manually switching the negative lead from PS2 an electrical switch similar to 60 could be used for automation purposes. The +positive lead would simply go to the workpiece as shown. A smaller electrode 32 would be used such that it could slide into and through the hollow cathode 504 in order to touch the workpiece and strike an arc. The electrically conductive nozzle 802 would be replaced with a non-conducting shield nozzle. This setup allows for precision cutting using just wastewater and no other gases.

Turning to FIG. 9, the Solid Oxide Non-Transferred Arc Plasma Torch 800 is used primarily for melting, gasifying and heating materials while using a contaminated fluid as the plasma gas. Switch 60 is adjusted such that PS2 +lead feeds electrode 32. Once again electrode 32 is now operated as the anode. It must be electrically isolated from vessel 402. When gas begins to flow by opening valve 16 the volute 31 imparts a spin or whirl flow to the gas. The anode 32 is lowered to touch the centered cathode 504. An arc is formed between the cathode 32 and anode 504. The anode may be hollow and a wire may be fed through the anode 504 for plasma spraying, welding or initiating the arc.

The entire torch is regeneratively cooled with its own gases thus enhancing efficiency. Likewise, a waste fluid is used as the plasma gas which reduces disposal and treatment costs. Finally, the plasma may be used for gasifying coal, biomass or producing copious amounts of syngas by steam reforming natural gas with the hydrogen and steam plasma.

Both FIGS. 8 and 9 have clearly demonstrated a novel Solid Oxide Plasma Arc Torch that couples the efficiencies of high temperature electrolysis with the capabilities of both transferred and non-transferred arc plasma torches.

EXAMPLE 7

Multi-Mode Plasma Arc Torch

Figure 11:
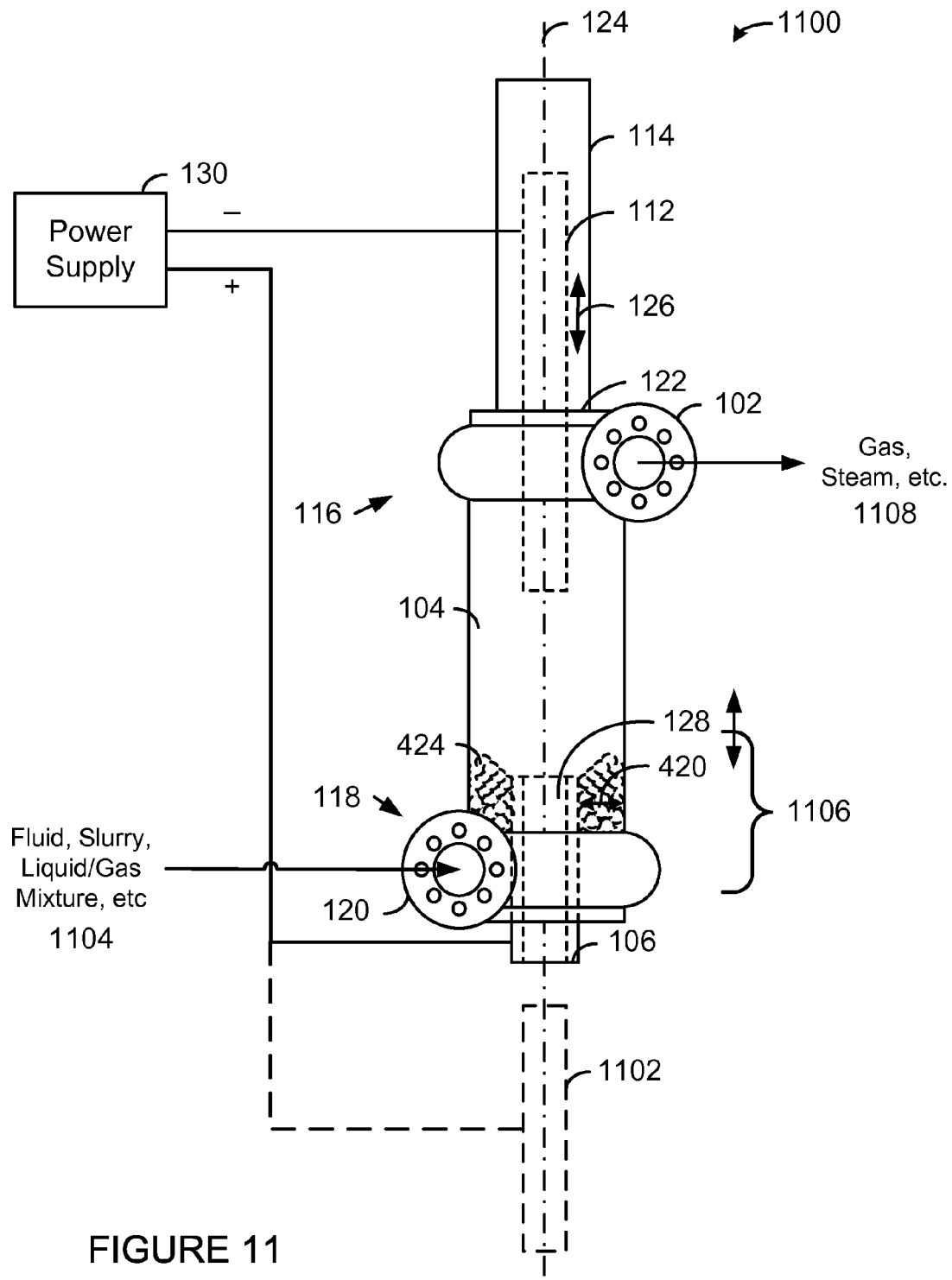
FIG. 11 is a cross-sectional view of a Multi-Mode Plasma Arc Torch in accordance with another embodiment of the present invention.

Now referring to FIG. 11, a multi-mode plasma arc torch 1100 in accordance with one embodiment of the present invention is shown. The multi-mode plasma arc torch 1100 is a plasma arc torch 100 of FIG. 1 that is modified to include some of the attributes of the glow discharge cell 500 of FIG. 5. The multi-mode plasma arc torch 1100 includes a cylindrical vessel 104 having a first end 116 and a second end 118. A tangential inlet 120 is connected to or proximate to the second end 118 and a tangential outlet 102 is connected to or proximate to the first end 116. An electrode housing 122 is connected to the first end 116 of the cylindrical vessel 104 such that a first electrode 112 is aligned with the longitudinal axis 124 of the cylindrical vessel 104, extends into the cylindrical vessel 104, and can be moved along the longitudinal axis 124. Moreover, a linear actuator 114 is connected to the first electrode 112 to adjust the position of the first electrode 112 within the cylindrical vessel 104 along the longitudinal axis of the cylindrical vessel 124 as indicated by arrows 126. The hollow electrode nozzle 106 is connected to the second end 118 of the cylindrical vessel 104 such that the centerline of the hollow electrode nozzle 106 is aligned with the longitudinal axis 124 of the cylindrical vessel 104. In the embodiment shown, the tangential inlet 120 is volute attached to the second end 118 of the cylindrical vessel 104, the tangential outlet 102 is a volute attached to the first end 116 of the cylindrical vessel 104, the electrode housing 122 is connected to the outlet volute 102, and the hollow electrode nozzle 106 (cylindrical configuration) is connected to the inlet volute 120. Note that the multi-mode plasma arc torch 1100 is not shown to scale.

A substantially equidistant gap 420 is maintained between the cylindrical vessel 402 and the hollow electrode nozzle 106. In some embodiments, a non-conductive granular material 424 is disposed within the gap 420, wherein the non-conductive granular material 424 allows an electrically conductive fluid to flow between the cylindrical vessel 402 and the hollow electrode nozzle 106. In other embodiments, the non-conductive granular material 424 is not used. Note that using the non-conductive granular material 424 improves the efficiency of the device by increasing the contact surface area for the fluid, but is not required. If the cylindrical vessel 402 is metallic, the non-conductive granular material 424 can prevent electrical arcing between the cylindrical vessel 402 and the hollow electrode nozzle 106 during a electric glow discharge. The shape of the hollow portion 128 of the hollow electrode nozzle 106 can be varied as needed to provide the desired operational results as shown in FIGS. 12 and 13A-F. Other shapes can be used.

A power supply 130 is electrically connected to the multi-mode plasma arc torch 1100 such that the first electrode 112 serves as the cathode and the hollow electrode nozzle 106 serves as the anode. The voltage, power and type of the power supply 130 are dependent upon the size, configuration and function of the multi-mode plasma arc torch 1100. In some embodiments, a second electrode 1102 can be added as an (+) anode, such as a graphite electrode, along the longitudinal axis 124 to dead short to the first electrode 112 (−) cathode. This configuration allows for continuous feed of electrodes for continuous duty operation. Like the first electrode 112, the second electrode 1102 can be moved in either direction along the longitudinal axis 124 as shown by arrow 126.

A fluid, slurry, liquid/gas mixture or other pumpable material 1104 is introduced into the tangential inlet 120 to a desired fluid level 1106, which can vary based on the desired operational results, within the cylindrical vessel 104. Note that the actual level will typically fluctuate during operation. During startup, the linear actuator 114 moves the first electrode 112 into contact with the hollow electrode nozzle 106 or the second electrode 1102 and then either leaves the first electrode 112 there (dead short resistive heating mode) or draws the first electrode 112 back a specified distance yet remains below the desired fluid level 1106. As shown in FIG. 12, the linear actuator 114 can adjust the position of the first electrode 112 to operate the multi-mode plasma arc torch 1100 in a dead short resistive mode 1200, a submerged arc mode 1202, an electrolysis mode 1204 or a glow discharge mode 1206. As the fluid 1104 is heated in accordance with one of these four operating modes, gases or steam 1108 will rise and exit through tangential outlet 102. The fluid 1104 can be recirculated by allowing the fluid 1004 to flow through the hollow electrode nozzle 106 and reenter the cylindrical vessel 104 via tangential inlet 120. Note that the fifth operating mode is the plasma arc mode as described and shown in FIG. 1.

Figure 13A:
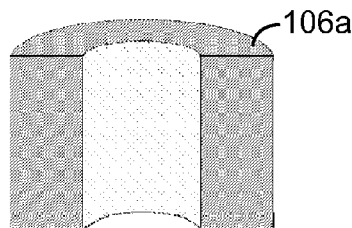
FIGS. 13A-13F are cross-sectional views of various shapes for the hollow electrode nozzle in accordance with another embodiment of the present invention.
Figure 13B:
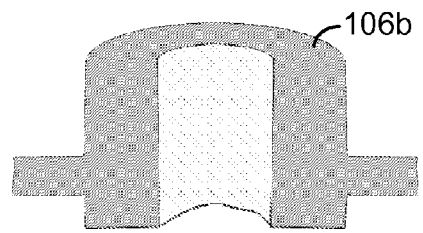
Figure 13C:
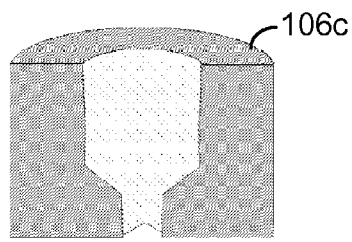
Figure 13D:
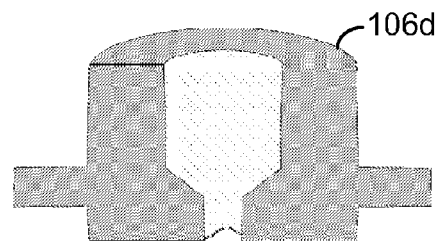
Figure 13E:
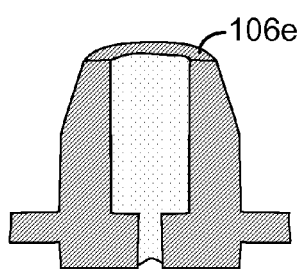
Figure 13F:
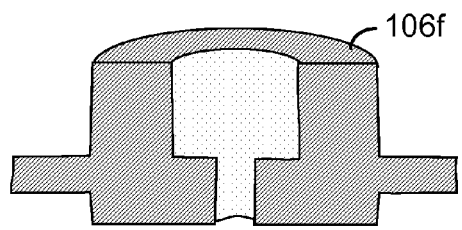

Referring now to FIGS. 13A-13F, various examples of shapes for the hollow electrode nozzle 106 are shown. FIG. 13A shows a straight hollow electrode nozzle 106a. FIG. 13B shows a straight hollow electrode nozzle flange 106b. FIG. 13C shows a tapered hollow electrode nozzle 106c. FIG. 13D shows a tapered hollow electrode nozzle flange 106d. FIG. 13E shows a hollow electrode nozzle counterbore flange 106e. FIG. 13F shows a hollow electrode nozzle counterbore exterior tapered flange 106f. Note that FIG. 12 shows a hollow electrode nozzle counterbore 106. Other shapes can be used as will be appreciated by those skilled in the art.

Figure 14:
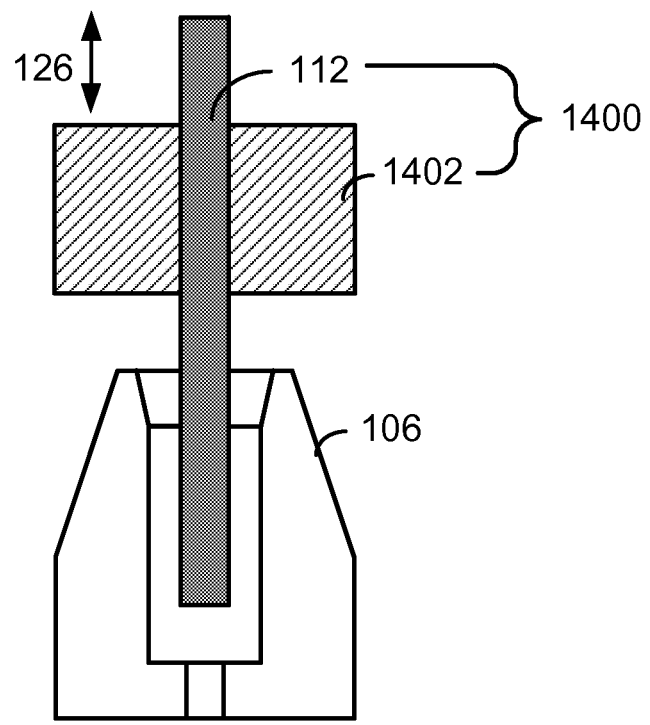
FIG. 14 is a cross-sectional view of dual first electrode configuration in accordance with another embodiment of the present invention.

Now referring to FIG. 14, a diagram of a dual first electrode 1400 in accordance with another embodiment of the present invention is shown. The dual first electrode is a combination of the first electrode 112 and a larger diameter, but shorter, third electrode 1402 that is either electrically connected to the first electrode 112 or the power supply 130 (same polarity as the first electrode 112). The third electrode 1402 can be moved up and down as indicated by arrows 126. Moreover, the third electrode 1402 can be physically connected to the first electrode 112. The third electrode 1402 provides additional electrode surface area to enhance the process.

Figure 15:
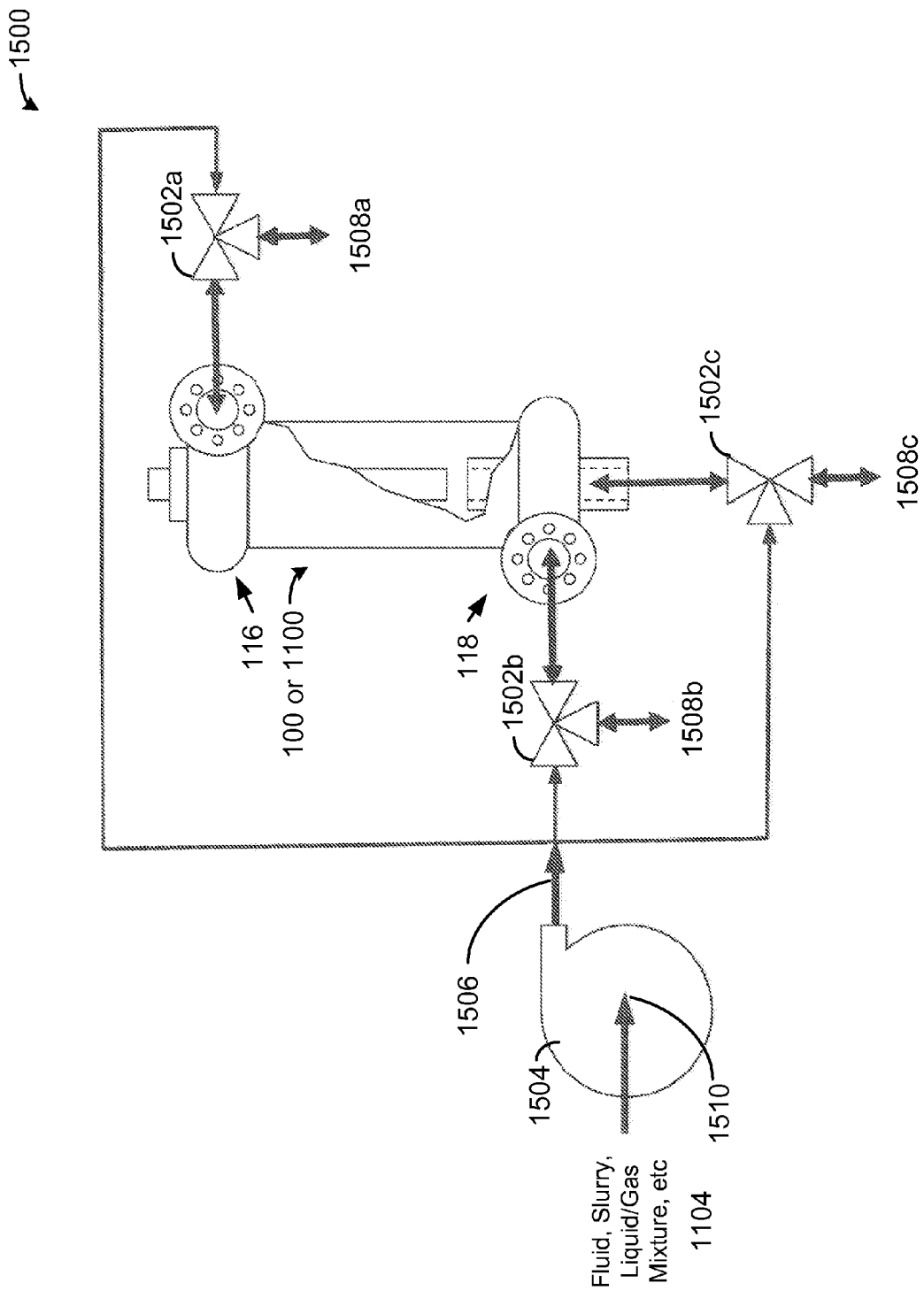
FIG. 15 is a block diagram of a system for operating the Multi-Mode Plasma Arc Torch in five different modes in accordance with another embodiment of the present invention.

Referring now to FIG. 15, a diagram of a system 1500 to operate the plasma arc torch 100 or 1100 in five operating modes in accordance with the present invention is show. The system 1500 includes a plasma arc torch 100 or 1100, three three-way valves 1502a, 1502b, 1502c and a pump and/or compressor 1504. The first three-way valve 1502a is connected to the inlet/outlet (depends on the operating mode) located at the first end 116 of the plasma arc torch 100 or 1100, and has a first valve inlet/outlet (depends on the operating mode) 1508a. The second three-way valve 1502b is connected to the inlet/outlet (depends on the operating mode) located at the second end 118 of the plasma arc torch 100 or 1100, and has a second valve inlet/outlet (depends on the operating mode) 1508b. The third three-way valve 1502c is connected to the exterior end of the hollow electrode nozzle 106, and has a third valve inlet/outlet (depends on the operating mode) 1508c. Each of the three-way valves 1502a, 1502b, 1502c are connected to the discharge 1506 of the pump and/or compressor 1504. The fluid, slurry, liquid/gas mixture or other pumpable/compressable material 1104 enters the suction 1510 of the pump and/or compressor 1504. The three-way valves 1502 are adjusted to operate the plasma arc torch 100 or 1100 in the five modes, while adjusting the first electrode 112 with the linear actuator 114.

Operating Mode 1: Plasma Arc
  a. Compressed and/or pressurized fluid 1104 from a pump/compressor 1504 is flowed into three-way valve 1502a and then into plasma arc torch 100 or 1100.
  b. Three-way valve 1502b is fully open to allow fluid to flow out of plasma arc torch 100 or 1100 and to outlet 1508b.
  c. Three-way valve 1502c is fully open to flow to outlet 1508c.
  d. Ensure (−) first electrode 112 is dead shorted to (+) hollow electrode nozzle 106.
  e. Ensure whirl glow is established.
  f. Turn power supply 130 ON.
  g. Using linear Actuator 114 pull back the (−) first electrode 112 to establish and arc.
  h. Arc is transferred from (−) to (+).
  i. Whirling gas flowing through (+) hollow electrode nozzle 106 forms a plasma.
  j. Very small plasma may be discharged through outlet 1508c.
  k. Three-way valve 1502b may be throttled to increase/decrease plasma flow through (+) hollow electrode nozzle 106 and outlet 1508c.
  l. Three-way valve 1502b may be shut to flow all fluid into (+) hollow electrode nozzle 106 and outlet 1508c.

Operating Mode 2: Resistive Heating
  a. Compressed and/or pressurized fluid 1104 from a pump/compressor 1504 is flowed into three-way valve 1502b and then into plasma arc torch 100 or 1100
  b. Three-way valve 1502a is fully open to flow out of plasma arc torch 100 or 1100 and to outlet 1508a.
  c. Three-way valve 1502b is throttled to allow fluid to flow into plasma arc torch 100 or 1100 very slowly.
  d. Three-way valve 1502c is shut.
  e. The (−) first electrode 112 is dead shorted to (+) hollow electrode Nozzle 106.
  f. Power supply 130 is turned ON.
  g. Resistive mode begins.
  h. Vapors exit through three-way valve 1502a and outlet 1508a

Operating Mode 3: Submerged Arc
  a. Valves remain aligned as in Operating Mode 2 above.
  b. Power supply 130 is still ON.
  c. The (−) first electrode 112 is slowly within drawn from (+) hollow electrode nozzle 106.
  d. The system shifts from resistive heating to submerged arc mode.
  e. Three-way valve 1502c may be opened to allow pressurized fluid from pump/compressor 1504 to flow through (+) hollow electrode nozzle 106 and into plasma arc torch 100 or 1100.
  f. Vapors exit the plasma arc torch 100 or 1100 through outlet 1508a.

Operating Mode 4: Electrolysis
  a. Valves remain aligned as in Operating Mode 2 above.
  b. Power supply 130 is still ON.

c. The (−) first electrode 112 is slowly within drawn further from (+) hollow electrode nozzle 106 using linear actuator 114.
d. The system shifts from submerged arc to electrolysis mode.

Operating Mode 5: Glow Discharge
a. Valves remain aligned as in Operating Mode 2 above.
b. Power supply 130 is still ON.
c. The (−) first electrode 112 is slowly within drawn further from (+) hollow electrode nozzle 106 using linear actuator 114.
d. Monitor the power supply 130 voltage.
e. When the voltage increases to open circuit voltage ("OCV"), the system is operating in glow discharge mode.
f. The amps will decrease.
g. Three-way valve 1502b and three-way valve 1502c may be adjusted to allow pressurized flow to enter plasma arc torch 100 or 1100 either through three-way valve 1502b or three-way valve 1502c, and/or three-way valve 1502b and three-way valve 1502c aligned for fluid flow recirculation using pump/compressor 1504.
h. Vapors exit from plasma arc torch 100 or 1100 and out of outlet 1508a.

The plasma arc torch 100 or 1100 can be adapted for use in many applications by attaching various devices to the exterior of the hollow electrode nozzle 106 or the three-way valve 1502c. The device may include, but are not limited to, valve, vessel, flange, cover, hatch, tee, electrode stinger, eductor, injector, pump, compressor, screw press, auger, ram feeder, mixer, extruder, T-fired boiler, coker drum, gasifier, pipe, conduit, tubing, submerged melting furnace, rotary kiln, rocket nozzle, thermal oxidizer, cyclone separator inlet, cyclone separator vortex collector, cyclone separator overflow or underflow, cyclone combustor, precombustion chamber, ice screw-in cylinder, turbine combustor, pulse detonation engine, combustion exhaust pipe/stack, thermal oxidizer, flare, water tank, raw sewage pipe, wastewater influent/effluent piping/conduit, anaerobic digester influent/effluent piping, sludge press/centrifuge inlet/outlet piping, potable water piping point of use or point of entry, water storage tank, CNC cutting/welding table, direct contact water heater, wet gas chlorine line/pipe, O&G wellhead, O&G produced water piping, ship ballast water line, engine fuel line, froth flotation inlet/outlet, conduit extending inside tank/vessel, submerged inside tank/vessel, porous tube, wedge wire screen, well screen, filter, activated carbon filter, ceramic filter, cat cracker catalyst recycle line, hospital vacuum suction pump, cooling tower piping, steam separator, superheater, boiler water feedwater piping, ro reject piping, vacuum chamber inlet/outlet, graywater discharge piping, ship ballast water inlet/outlet piping, bilge water inlet/outlet piping, toilet discharge piping, grinder/shredder/macerator discharge piping, and/or kitchen sink garbage disposer outlet piping, nuclear reactor containment building for hydrogen mitigation (hydrogen igniter), infrared heating element/piping, charge heater, furnace and/or coke calciner.

Steam Plasma Arc Mode

Three-way valves 1502a and 11502b were connected to the tangential inlet 118 and tangential outlet 134 of the plasma arc torch 100 disclosed in FIG. 1. During testing with the three-way valve 1502b attached as shown, when the valve V# is fully closed, the plasma 108 of FIG. 1 was discharged from the plasma arc torch 100 and was measured with an optical pyrometer. With the gases produced from the CELL 500 as shown in FIGS. 6 and 7, the plasma 108 temperature was measured at +3,000° C. (+5,400° F.). With only air, the plasma 108 was measured at +2,100° C. (+3,800° F.). The system as shown in 700 was operated with a ceramic TEE as disclosed in FIG. 17 and shown attached to the plasma arc torch 100 in FIG. 14.

Figure 18:
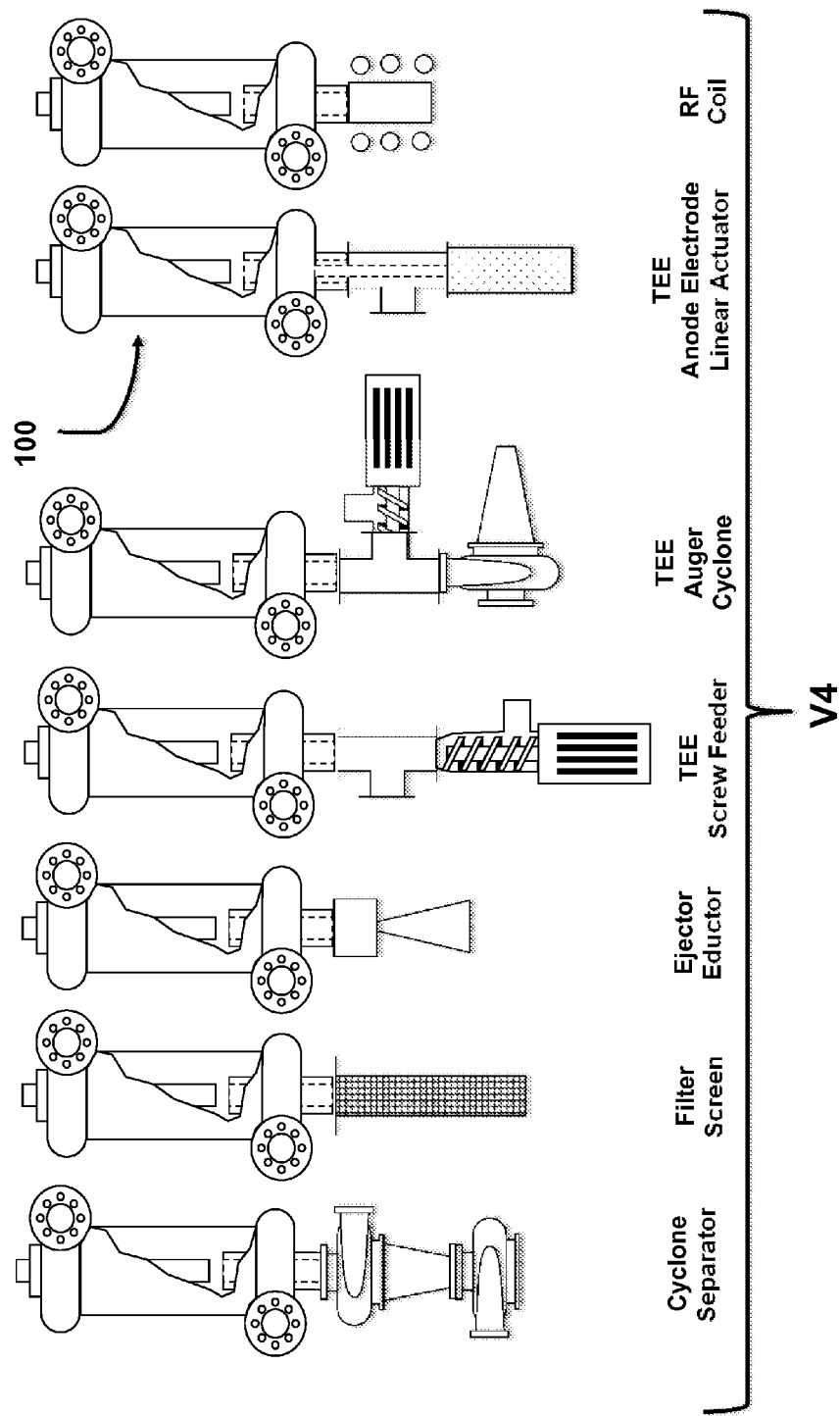
FIG. 18 is a diagram of a Multi-Mode Plasma Arc Torch with various attachment devices in accordance with another embodiment of the present invention.

Likewise, a Filter Screen was attached as shown in FIG. 18 to the plasma arc torch 100. Wood pellets produced with a pelletizer were placed in the Filter Screen prior to attaching to the plasma arc torch 100. The steam plasma fully carbonized the wood pellets.

The plasma arc torch 100 Filter Screen is particularly useful for remote and/or stand alone water treatment and black water (raw sewage) applications.

Resistive Heating/Dead Short

The plasma arc torch 100 or 1100 is started by dead-shorting the cathode to the anode with power supply in the off position. Next, the vessel is partially filled by jogging the pump. Next the power supply is turned on allowing the system to operate in a resistive heating mode. The benefit to this system is preventing the formation of gases such as chlorine if sodium chloride is present within the water and/or wastewater. The fluid, water and/or wastewater is heat treated which is commonly referred to as pasteurization.

Submerged Arc Oxidation and Combustion

If the system is to be operated in a Submerged Arc Mode, the cathode is simply withdrawn from the anode. A submerged arc will be formed instantly. This will produce noncondensible gases such as hydrogen and oxygen by splitting water. In order to aid in forming a gas vortex around the arc gases such as but not limited to methane, butane, propane, air, oxygen, nitrogen, argon, hydrogen, carbon dioxide, argon, biogas and/or ozone or any combination thereof can be added between the pump and inlet 1502a or 1502b with an injector (not shown). However, it is well known that hydrogen peroxide will convert to oxygen and water when irradiated with UV light. Thus, the plasma arc torch 100 or 1100 will convert hydrogen peroxide to free radicals and oxygen for operation as an advanced oxidation system.

On the other hand, the present invention's Submerged Arc Mode is ideally suited for submerged combustion. It is well known that submerged combustion is very efficient for heating fluids. Likewise, it is well known and understood that gases and condensates are produced along with heavy oil from Oil and Gas wells. In addition, the oil sands froth flotation process produces tailings and wastewater with residual solvent and bitumen.

The remaining fossil fuels left in produced water and/or froth flotation processes can be advantageously used in the present invention. Since the plasma arc torch 100 or 1100 is a cyclone separator then the lighter hydrocarbons will report to the plasma center. Consequently by sparging air into the plasma arc torch 100 or 1100 it can be operated as a submerged arc combustor.

Figure 17:
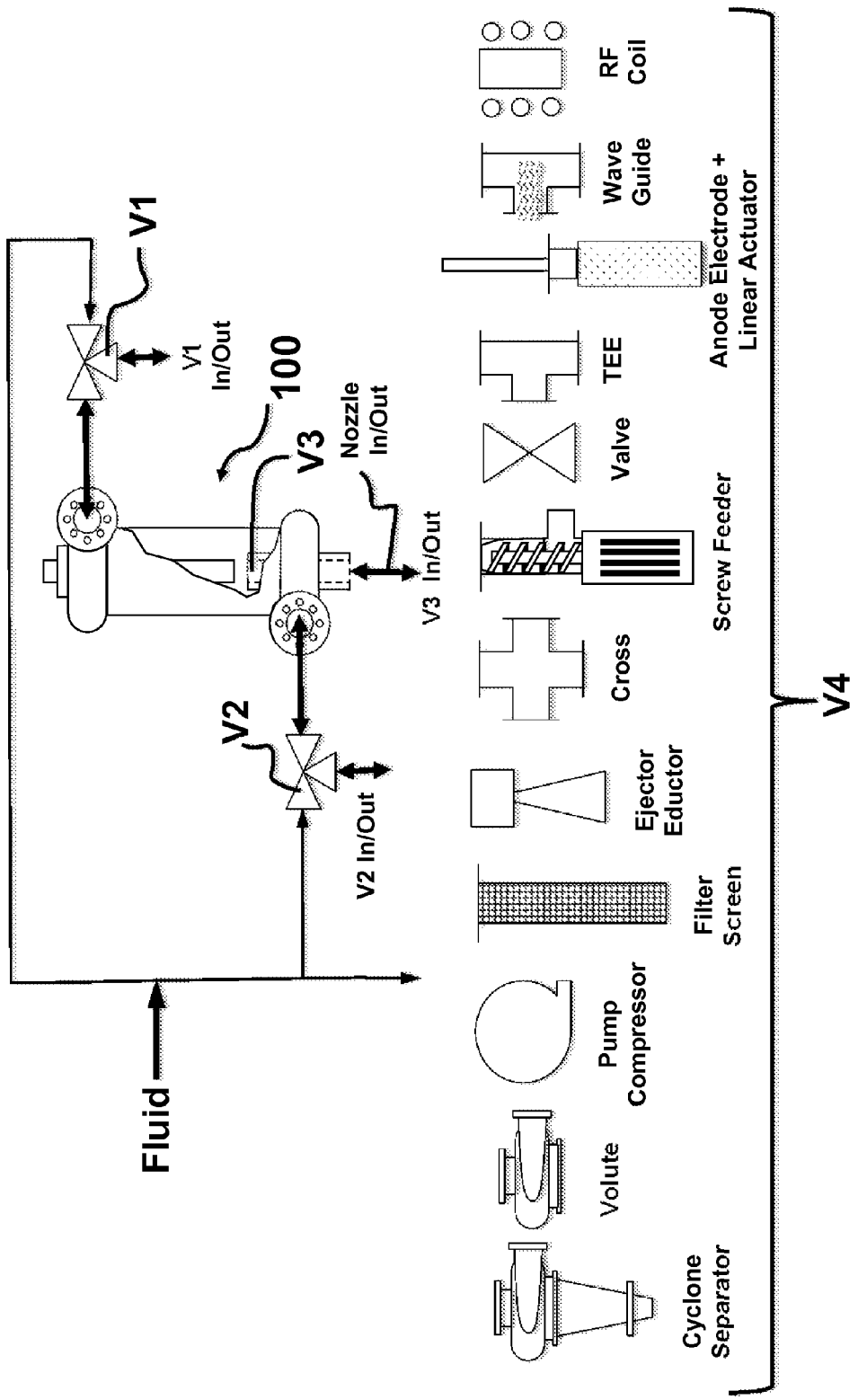
FIG. 17 is a diagram of a Multi-Mode Plasma Arc Torch with various attachment devices in accordance with another embodiment of the present invention.

For example, to ensure that the arc is not extinguished a second electrode can be added to the plasma arc torch 100 or 1100 as shown in FIG. 17's TEE Electrode Linear Actuator. Air and/or an air/fuel mixture can be flowed into the TEE and converted into a Rotating Plasma Arc Flame. The fluid to be heated will enter into one volute while exiting the other volute in combination with hot combusted gases. On the other hand, the air/fuel may be added to the fluid entering into the plasma arc torch 100 or 1100. Three-way valve 1502b would be shut. Thus, the mixture of combusted gases and water would flow through the anode nozzle and exit out of the TEE. A volute or Cyclone Separator may be used in lieu of the TEE. If a Cyclone Separator is used, then the plasma arc torch 100 or 1100 can be operated as a Torch while shooting a plasma into the vortex of the whirlpool of water within the Cyclone Separator. The benefit of the second (+) electrode is to ensure that the arc remains centered and is not blown out. The discharge from the TEE, Volute or Cyclone Separator would be flowed into a tank (not shown) or stand pipe thus allowing complete mixture and transfer of heat from the non-condensible gas bubbles to the water/fluid.

Electrolysis

In order to transition to an electrolysis mode the electrode is withdrawn a predetermined distance from the anode nozzle or anode electrode. This distance is easily determined by recording the amps and volts of the power supply as shown by the GRAPH in FIG. 3. The liquid level is held constant by flowing liquid into the plasma arc torch 100 or 1100 by jogging the pump or using a variable speed drive pump to maintain a constant liquid level.

Although not shown a grounding clamp can be secured to the vessel in order to maintain an equidistant gap between the vessel and cathode, provided the vessel is constructed of an electrically conducted material. However, the equidistant gap can be maintained between the anode nozzle and cathode and electrically isolating the vessel for safety purposes. Glass and/or ceramic lined vessels and piping are common throughout many industries.

By operating in an electrolysis mode this allows for the production of oxidants in particularly sodium hypochlorite (bleach), if sodium chloride is present or added to the water. Bleach is commonly used on offshore production platforms for disinfecting sponsoon water, potable water and raw sewage. Since electrolysis is occurring between and within the equidistance gap between the (+) anode nozzle and (−) cathode electrode the present invention overcomes the problems associated with electrolyzers used on production platforms as well as ships for ballast water disinfection.

By installing two or more plasma arc torch 100 or 1100, one can be operated in a submerged arc combustion mode, while the other is operated in an electrolysis mode. The Submerged ArcWhirl® Combustor would be configured as shown in FIG. 18 with a TEE and Electrode and an air ejector would siphon the hydrogen generated from the plasma arc torch 100 or 1100. Another benefit for using the ArcWhirl® in a Plasma Arc Combustion mode is that the Ultraviolet ("UV") Light produced from the plasma arc and the electrodes will dechlorinate the water thus eliminating adding a reducing agent to the water.

A simple but effective raw sewage system can be constructed by attaching the plasma arc torch 100 or 1100 to a common filter vessel in which the filter screen would be coupled directly to the plasma arc torch 100 or 1100. Referring to FIG. 18 the plasma arc torch 100 or 1100 is coupled to the Filter Screen. The ArcWhirl® Filter Screen is then inserted into a common filter vessel up to the Filter Screen Flange. The plasma arc torch 100 or 1100 is operated in an electrolysis mode allowing the raw sewage to flow through the anode nozzle and into the filter screen. Solids would be trapped in the filter screen.

The filter screen can be cleaned by several methods. First the screen can simply be backwashed. Second the screen can be cleaned by simply placing the ArcWhirl® in a Plasma Arc Mode and either steam reforming the solids or incinerating the solids using an air plasma. However, a third mode can be used which allows for a combination of back washing and glow discharge.

Glow Discharge

To transition to Glow Discharge, the liquid level can be decreased by throttling three-way valve 1502b until the plasma arc torch 100 or 1100 goes into glow discharge. This is easily determined by watching volts and amps. When in glow discharge the power supply voltage will be at or near open circuit voltage. However, to rapidly transition from Electrolysis to Glow Discharge the cathode electrode is extracted until the power supply is at OCV. This can be determined by viewing the glow discharge thru a sight glass or watching the voltage meter.

This novel feature also allows for FAIL SAFE OPERATION. If the pump is turned off or fluid flow is stopped then all of the water will be blowndown through the anode nozzle of the plasma arc torch 100 or 1100. Electrical flow will stop and thus the system will not produce any gases such as hydrogen.

To control the liquid level a variable speed drive pump in combination with three-way valve 1502c may be used to control the liquid level to maintain and operate in a glow discharge mode. Another failsafe feature, such as a spring, can be added to the linear actuator such that the system fails with the cathode fully withdrawn.

The mode of operation can be reversed from Glow Discharge to Electrolysis to Arc and then to Resistive Heating. By simply starting with the cathode above the water level within the vessel, then slowly lowering the cathode to touch the surface of the liquid, the plasma arc torch 100 or 1100 will immediately go into glow discharge mode. Continually lowering the cathode will shift the system to electrolysis then to arc then to resistive heating.

Now to operate the plasma arc torch 100 or 1100 as a plasma torch, water/liquid flow may be reversed and blowdown three-way valve 1502c is fully opened to allow the plasma to discharge from the plasma arc torch 100 or 1100. Adding an anode electrode as shown in FIG. 17 will aid in maintaining an arc. However, if a sufficient amount of gas in entrained in the water and a gas vortex is formed, the water/liquid can be flowed through the plasma arc torch 100 or 1100 in a Plasma Arc Mode.

Although no granular media is needed for this configuration it will be understood that granular media may be added to enhance performance. Likewise, what has not been previously disclosed is that this configuration always for purging the vessel and removing the granular media by reversing the flow through the system. Referring to FIG. 1 outlet 118 is used as the inlet and inlet 120 is used as the outlet. This configuration will work for any fluid whether it is more dense or less dense than water and/or the liquid flowing through the system. If the material density is greater than the liquid the granular material will flow through 120. If the material is less dense then the liquid then it will flow through the nozzle.

Figure 16:
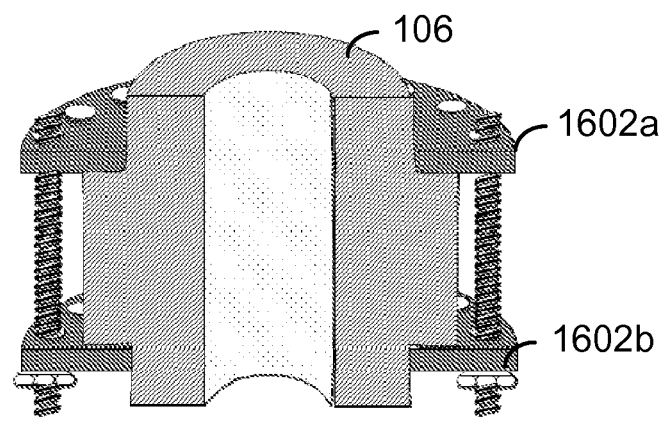
FIG. 16 is a cross-sectional view of an anode nozzle flange mounted assembly for the Multi-Mode Plasma Arc Torch in accordance with another embodiment of the present invention.

FIG. 16 shows a method for securing the (+) hollow electrode nozzle 106 to the volute of plasma arc torch 100 or 1100 using flanges 1602a, 1602b as a coupling means. It will be understood that any type of coupler that will hold and secure the (+) hollow electrode nozzle 106 will suffice for use in the present invention. Likewise, using couplers or flanges on both sides of the (+) hollow electrode nozzle 106 allows for it to be flipped and used as a protruding or reducer type coupling nozzle.

In particularly, remote applications that are in dire need of a solution are potable water treatment and black water (raw sewage) treatment. For example, remote water and wastewater applications can be found on offshore drilling rigs, offshore production platforms, ships, cabins, base camps, military posts/camps, small villages in desert and/or arid environments and many developing countries that do not have centralized water and wastewater treatment facilities. Another remote application is electricity produced from wind and solar farms. Likewise, oil and gas wells that are not placed in production such as stranded gas can be considered a remote application. Also, after a natural disaster, such as a hurricane or tsunami basic services such as garbage/trash collection, water treatment and wastewater treatment facilities may be destroyed, thus there is a dire need for water disinfection as well as raw sewage treatment in addition to handling the buildup of trash.

The inventor of the present invention has tested this configuration with an ESAB EPW 360 power supply. The EPW 360 is a "Chopper" type DC power supply operating at a frequency of 18,000 Hertz. The above described configuration held voltage at an extremely steady state. The discharge 134 was throttled with a valve. Whether the valve was open, shut or throttled the voltage remained rock steady. Likewise, the EPW 360 current control potentiometer was turned down to less than 30 amps and the electrodes were positioned to hold 80 volts. This equates to a power rating of about 2,400 watts. The EPW 360 is rated at 360 amps with an open circuit voltage of 360 vdc. At a maximum power rating of 129,600 watts DC, then: 129,600÷2,400=54.

Consequently, the plasma arc torch 100 of the present invention clearly demonstrated a turn down rate of 54 without any additional electronic controls, such as a secondary high frequency power supply. That is virtually unheard of within the plasma torch world. For example, Pyrogensis markets a 25 kw torch operated in the range of 8-25 kW (A 3:1 turn down ratio). Furthermore the present invention's plasma arc torch 100 does not require any cooling water. The Pyrogensis torch requires cooling with deionized water. Deionized ("DI") water is used because the DI water is flowed first into one electrode then into the shield or another part of the torch. Consequently, DI water is used to avoid conducting electricity from the cathode to the anode via the cooling media. In addition, heat rejection is another impediment for using an indirectly cooled plasma torch. An indirectly cooled plasma torch may reject upwards of 30% of the total input power into the cooling fluid.

The plasma arc torch 100 as disclosed in FIGS. 1, 6, 7 is a liquid/gas separator and extreme steam superheater forming an ionized steam/hydrogen plasma when coupled to the glow discharge cell 500 and/or any steam source. As disclosed in FIGS. 6 and 7 the plasma arc torch 100 can easily be controlled by manipulating valves 604 and 606

The plasma arc torch 100 as shown in FIG. 1 is similar to a blow-back torch. For example the (−) negative electrode 112 will dead short and shut flow through the (+) anode nozzle 106 by adjusting the linear actuator 114. However, by adding control valve 604 to the discharge 134, this allows for the plasma arc torch 100 to be operated in a resistive heating mode.

Referring now to FIG. 17 while comparing to FIGS. 1 and 12A by selecting the (+) anode nozzle(s) as shown in FIG. 1 and/or 12A, then the combination of the (−) electrode rod and (+) and anode nozzle form a stopper valve V3 as shown in FIG. 23. Thus, this allows for controlling the flow in/out of the (+) anode nozzle.

The present invention's plasma arc torch 100 has been tested and operated with various attachments coupled to the (+) anode nozzle. V4 represents a partial list of attachments selected from a group consisting of a cyclone separator, volute, pump/compressor, filter screen, ejector/eductor, cross, Screw Feeder, Valve, TEE, Electrode & Linear Actuator, Wave Guide and RF Coil that may be attached alone or in any combination thereof to the (+) Anode Nozzle.

FIG. 18 demonstrates how the Attachments V4 may be connected to the plasma arc torch 100. For example, the plasma arc torch 100 may have an additional Electrode with a Linear Actuator coupled by means of a TEE. It will be understood that the coupling means may be selected from any type of coupling device know in the art, ranging from flanges, quick connectors, welding in addition to using the cyclone separator as shown in FIG. 18 with quick connectors such as sanitary type clamps.

By adding a secondary electrode and linear actuator this allows for continuous feeding of electrodes in order to increase the life of the anode nozzle. Furthermore, referring to the anode nozzle of FIG. 12B the additional electrode allows for operating in an Arc Mode by dead shorting the electrodes together.

The foregoing description of the apparatus and methods of the invention in preferred and alternative embodiments and variations, and the foregoing examples of processes for which the invention may be beneficially used, are intended to be illustrative and not for purpose of limitation. The invention is susceptible to still further variations and alternative embodiments within the full scope of the invention, recited in the following claims.

What is claimed is:

1. A method for operating a multi-mode plasma arc torch comprising the steps of:
providing the multi-mode plasma arc torch comprising a cylindrical vessel having a first end and a second end, a first tangential inlet/outlet connected to or proximate to the first end, a second tangential inlet/outlet connected to or proximate to the second end, an electrode housing connected to the first end of the cylindrical vessel such that a first electrode is (a) aligned with a longitudinal axis of the cylindrical vessel, and (b) extends into the cylindrical vessel, and a hollow electrode nozzle connected to the second end of the cylindrical vessel such that a center line of the hollow electrode nozzle is aligned with the longitudinal axis of the cylindrical vessel, the hollow electrode having a first end disposed within the cylindrical vessel and a second end disposed outside the cylindrical vessel; and
operating the multi-mode plasma arc torch in a dead short resistive mode, a submerged arc mode, an electrolysis mode, a glow discharge mode or a plasma arc mode by adjusting a position of the first electrode with respect to the hollow electrode.

2. The method as recited in claim 1, further comprising a non-conductive granular material disposed between the hollow electrode nozzle and the cylindrical vessel.

3. The method as recited in claim 1, wherein the non-conductive granular material comprises marbles, ceramic beads, molecular sieve media, sand, limestone, activated carbon, zeolite, zirconium, alumina, rock salt, nut shell or wood chips.

4. The method as recited in claim 1, the first end of the cylindrically shaped electrode having a first inner diameter that is larger than a second inner diameter of the second end of the cylindrically shaped electrode nozzle.

5. The method as recited in claim 4, the first inner diameter and the second inner diameter forming a counterbore.

6. The method as recited in claim 4, further comprising a first tapered portion within the cylindrically shaped electrode that transitions from the first inner diameter to the second inner diameter.

7. The method as recited in claim 4, further comprising a second tapered portion within the cylindrically shaped electrode that transitions from the first inner diameter to a third inner diameter at the first end of the cylindrically shaped electrode wherein the third inner diameter is larger than the first inner diameter.

8. The method as recited in claim 1, the hollow electrode nozzle having an external flange.

9. The method as recited in claim 1, wherein the step of operating the multi-mode plasma arc torch in the dead short resistive mode comprises adjusting the position of the first electrode to contact the hollow electrode nozzle.

10. The method as recited in claim 1, wherein the step of operating the multi-mode plasma arc torch in the submerged arc mode comprises adjusting the position of the first electrode to extend into the hollow electrode nozzle proximate to the second end of the hollow electrode nozzle.

11. The method as recited in claim 1, wherein the step of operating the multi-mode plasma arc torch in the electrolysis mode comprises adjusting the position of the first electrode to extend into the hollow electrode nozzle proximate to the first end of the hollow electrode nozzle.

12. The method as recited in claim 1, wherein the step of operating the multi-mode plasma arc torch in the glow discharge mode comprises adjusting the position of the first electrode to be proximate to the first end of the hollow electrode nozzle.

13. The method as recited in claim 1, wherein the step of operating the multi-mode plasma arc torch in the plasma arc mode comprises adjusting the position of the first electrode to be spaced apart from the first end of the hollow electrode nozzle.

14. The method as recited in claim 1, further comprising a second electrode disposed outside of the cylindrical vessel proximate to the second end of the hollow electrode nozzle.

15. The method as recited in claim 14, the second electrode aligned with the longitudinal axis of the cylindrical vessel and sized to pass through the hollow electrode nozzle and contact the first electrode.

16. The method as recited in claim 1, further comprising a third electrode disposed around a portion of the first electrode and having a same polarity as the first electrode.

17. The method as recited in claim 1, further comprising a power supply electrically connected to the first electrode and the hollow electrode nozzle.

18. The method as recited in claim 1, further comprising:
a first three-way valve connected to the first tangential inlet/outlet; and
a second three-way valve connected to the second tangential inlet/outlet.

19. The method as recited in claim 18, further comprising a third three-way valve connected to the second end of the hollow electrode nozzle.

20. The method as recited in claim 19, further comprising a pump/compressor having a discharge connected to the first three-way valve and the second three-way valve.

21. The method as recited in claim 1, further comprising a cyclone separator, a volute, a pump compressor, a filter screen, an ejector, an eductor, a cross connector, a screw feeder, a valve, a tee connector, an linear actuator having an anode electrode, a wave guide or an RF coil connected to the second end of the hollow electrode nozzle.

22. A method for operating a multi-mode plasma arc torch comprising the steps of:
providing a plasma arc torch comprising a cylindrical vessel having a first end and a second end, a first tangential inlet/outlet connected to or proximate to the first end, a second tangential inlet/outlet connected to or proximate to the second end, an electrode housing connected to the first end of the cylindrical vessel such that a first electrode is (a) aligned with a longitudinal axis of the cylindrical vessel, and (b) extends into the cylindrical vessel, a hollow electrode nozzle connected to the second end of the cylindrical vessel such that a center line of the hollow electrode nozzle is aligned with the longitudinal axis of the cylindrical vessel, the hollow electrode nozzle having a first end disposed within the cylindrical vessel and a second end disposed outside the cylindrical vessel;
providing a pump/compressor;
providing a first three-way valve connected to the first tangential inlet/outlet and a discharge of the pump/compressor;
providing a second three-way valve connected to the second tangential inlet/outlet and the discharge of the pump/compressor;
providing a third three-way valve connected to the second end of the hollow electrode nozzle and the discharge of the pump/compressor; and
operating the multi-mode plasma arc torch in a dead short resistive mode, a submerged arc mode, an electrolysis mode, a glow discharge mode or a plasma arc mode by adjusting a position of the first electrode with respect to the hollow electrode.

23. The method as recited in claim 22, further comprising a non-conductive granular material disposed between the hollow electrode nozzle and the cylindrical vessel.

24. The method as recited in claim 22, wherein the non-conductive granular material comprises marbles, ceramic beads, molecular sieve media, sand, limestone, activated carbon, zeolite, zirconium, alumina, rock salt, nut shell or wood chips.

25. The method as recited in claim 22, further comprising a linear actuator operably connected to the first electrode to adjust the position of the first electrode with respect to the hollow electrode nozzle.

26. The method as recited in claim 22, the first end of the cylindrically shaped electrode having a first inner diameter that is larger than a second inner diameter of the second end of the cylindrically shaped electrode nozzle.

27. The method as recited in claim 26, the first inner diameter and the second inner diameter forming a counterbore.

28. The method as recited in claim 26, further comprising a first tapered portion within the cylindrically shaped electrode that transitions from the first inner diameter to the second inner diameter.

29. The method as recited in claim 26, further comprising a second tapered portion within the cylindrically shaped electrode that transitions from the first inner diameter to a third inner diameter at the first end of the cylindrically shaped electrode wherein the third inner diameter is larger than the first inner diameter.

30. The method as recited in claim 22, the hollow electrode nozzle having an external flange.

31. The method as recited in claim 22, wherein the step of operating the multi-mode plasma arc torch in the dead short resistive mode comprises adjusting the position of the first electrode to contact the hollow electrode nozzle.

32. The method as recited in claim 22, wherein the step of operating the multi-mode plasma arc torch in the submerged arc mode comprises adjusting the position of the first electrode to extend into the hollow electrode nozzle proximate to the second end of the hollow electrode nozzle.

33. The method as recited in claim 22, wherein the step of operating the multi-mode plasma arc torch in the electrolysis mode comprises adjusting the position of the first electrode to extend into the hollow electrode nozzle proximate to the first end of the hollow electrode nozzle.

34. The method as recited in claim 22, wherein the step of operating the multi-mode plasma arc torch in the glow discharge mode comprises adjusting the position of the first electrode to be proximate to the first end of the hollow electrode nozzle.

35. The method as recited in claim 22, wherein the step of operating the multi-mode plasma arc torch in the plasma arc mode comprises adjusting the position of the first electrode to be spaced apart from the first end of the hollow electrode nozzle.

36. The method as recited in claim 22, further comprising a third electrode disposed around a portion of the first electrode and having a same polarity as the first electrode.

37. The method as recited in claim 22, further comprising a power supply electrically connected to the first electrode and the hollow electrode nozzle.

38. A method for operating a multi-mode plasma arc torch comprising the steps of:
providing the multi-mode plasma torch comprising a cylindrical vessel having a first end and a second end, a first tangential inlet/outlet connected to or proximate to the first end, a second tangential inlet/outlet connected to or proximate to the second end, an electrode housing connected to the first end of the cylindrical vessel, the electrode housing having a first electrode aligned with a longitudinal axis of the cylindrical vessel, extending into the cylindrical vessel, moveable along the longitudinal axis, and electrically isolated from the cylindrical vessel, a hollow electrode nozzle connected to the second end of the cylindrical vessel such that a center line of the hollow electrode nozzle is aligned with the longitudinal axis of the cylindrical vessel, the hollow electrode nozzle having a first end disposed within the cylindrical vessel and a second end disposed outside the cylindrical vessel, and a linear actuator operably connected to the first electrode to adjust a position of the first electrode with respect to the hollow electrode nozzle; and
operating the multi-mode plasma arc torch in a dead short resistive mode, a submerged arc mode, an electrolysis mode, a glow discharge mode or a plasma arc mode by adjusting the position of the first electrode with respect to the hollow electrode nozzle using the linear actuator.

39. The method as recited in claim 38, further comprising a non-conductive granular material disposed between the hollow electrode nozzle and the cylindrical vessel.

40. The method as recited in claim 39, wherein the non-conductive granular material comprises marbles, ceramic beads, molecular sieve media, sand, limestone, activated carbon, zeolite, zirconium, alumina, rock salt, nut shell or wood chips.

41. The method as recited in claim 38, the first end of the cylindrically shaped electrode having a first inner diameter that is larger than a second inner diameter of the second end of the cylindrically shaped electrode nozzle.

42. The method as recited in claim 41, the first inner diameter and the second inner diameter forming a counterbore.

43. The method as recited in claim 41, further comprising a first tapered portion within the cylindrically shaped electrode that transitions from the first inner diameter to the second inner diameter.

44. The method as recited in claim 41, further comprising a second tapered portion within the cylindrically shaped electrode that transitions from the first inner diameter to a third inner diameter at the first end of the cylindrically shaped electrode wherein the third inner diameter is larger than the first inner diameter.

45. The method as recited in claim 38, the hollow electrode nozzle having an external flange.

46. The method as recited in claim 38, wherein the step of operating the multi-mode plasma arc torch in the dead short resistive mode comprises adjusting the position of the first electrode to contact the hollow electrode nozzle.

47. The method as recited in claim 38, wherein the step of operating the multi-mode plasma arc torch in the submerged arc mode comprises adjusting the position of the first electrode to extend into the hollow electrode nozzle proximate to the second end of the hollow electrode nozzle.

48. The method as recited in claim 38, wherein the step of operating the multi-mode plasma arc torch in the electrolysis mode comprises adjusting the position of the first electrode to extend into the hollow electrode nozzle proximate to the first end of the hollow electrode nozzle.

49. The method as recited in claim 38, wherein the step of operating the multi-mode plasma arc torch in the glow discharge mode comprises adjusting the position of the first electrode to be proximate to the first end of the hollow electrode nozzle.

50. The method as recited in claim 38, wherein the step of operating the multi-mode plasma arc torch in the plasma arc mode comprises adjusting the position of the first electrode to be spaced apart from the first end of the hollow electrode nozzle.

51. The method as recited in claim 38, further comprising a second electrode disposed outside of the cylindrical vessel proximate to the second end of the hollow electrode nozzle.

52. The method as recited in claim 51, the second electrode aligned with the longitudinal axis of the cylindrical vessel and sized to pass through the hollow electrode nozzle and contact the first electrode.

53. The method as recited in claim 38, further comprising a third electrode disposed around a portion of the first electrode and having a same polarity as the first electrode.

54. The method as recited in claim 38, further comprising a power supply electrically connected to the first electrode and the hollow electrode nozzle.

55. The method as recited in claim 38, further comprising:
a first three-way valve connected to the first tangential inlet/outlet; and
a second three-way valve connected to the second tangential inlet/outlet.

56. The method as recited in claim 55, further comprising a third three-way valve connected to the second end of the hollow electrode nozzle.

57. The method as recited in claim 55, further comprising a pump/compressor having a discharge connected to the first three-way valve and the second three-way valve.

58. The method as recited in claim 38, further comprising a cyclone separator, a volute, a pump compressor, a filter screen, an ejector, an eductor, a cross connector, a screw feeder, a valve, a tee connector, an linear actuator having an anode electrode, a wave guide or an RF coil connected to the second end of the hollow electrode nozzle.

* * * * *